United States Patent
Ikeno et al.

(10) Patent No.: US 7,843,529 B2
(45) Date of Patent: *Nov. 30, 2010

(54) STACKED MULTI-PANEL LCD DEVICE COMPRISING A FIRST DRIVING SIGNAL FOR DRIVING AT LEAST ONE OF SAID STACKED LCD PANELS AND A SECOND DRIVING SIGNAL FOR DRIVING ANOTHER OF SAID STACKED LCD PANELS BEING OBTAINED BY APPLYING AN AVERAGING PROCESSING TO SAID FIRST DRIVING SIGNAL

(75) Inventors: Hidenori Ikeno, Kawasaki Kanagawa (JP); Yuji Kondo, Kawasaki Kanagawa (JP); Sounosuke Takahashi, Kawasaki Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 707 days.

This patent is subject to a terminal disclaimer.

(21) Appl. No.: 11/737,019

(22) Filed: Apr. 18, 2007

(65) Prior Publication Data
US 2007/0242186 A1 Oct. 18, 2007

(30) Foreign Application Priority Data
Apr. 18, 2006 (JP) .............................. 2006-114523

(51) Int. Cl.
*G02F 1/1347* (2006.01)

(52) U.S. Cl. ............................. 349/81; 348/74; 348/82

(58) Field of Classification Search .................... 349/81, 349/82, 74
See application file for complete search history.

(56) References Cited

U.S. PATENT DOCUMENTS

| 4,952,036 | A | * | 8/1990 | Gulick et al. | ................. 349/82 |
| 2007/0242186 | A1 | * | 10/2007 | Ikeno et al. | ................... 349/74 |
| 2008/0088649 | A1 | * | 4/2008 | Ikeno et al. | ................. 345/690 |
| 2009/0147186 | A1 | * | 6/2009 | Nakai et al. | ................... 349/74 |

FOREIGN PATENT DOCUMENTS

| CN | 1246696 | 3/2000 |
| JP | 59-189625 | 12/1984 |
| JP | 64-010223 | 1/1989 |
| WO | WO 2007040127 A1 * | 4/2007 |

* cited by examiner

*Primary Examiner*—Brian M. Healy
*Assistant Examiner*—Dennis Y Kim
(74) *Attorney, Agent, or Firm*—Hayes Soloway P.C.

(57) ABSTRACT

A LCD unit (116) has a first and a second LCD panels (261, 262) which are stacked one on another. The first LCD panel (261) includes a color filter layer (251), and is configured as a color LCD panel for performing a color display. The second LCD panel (262) is configured as a monochrome LCD panel for performing a monochrome display based on an image source. The first LCD panel (261) displays an image, which is obtained by averaging the image data of the image source by using an arithmetic unit, which averages the image data pixels disposed within a range specific distance apart from a central pixel.

49 Claims, 11 Drawing Sheets

STACKED MULTI-PANEL LCD DEVICE COMPRISING A FIRST DRIVING SIGNAL FOR DRIVING AT LEAST ONE OF SAID STACKED LCD PANELS AND A SECOND DRIVING SIGNAL FOR DRIVING ANOTHER OF SAID STACKED LCD PANELS BEING OBTAINED BY APPLYING AN AVERAGING PROCESSING TO SAID FIRST DRIVING SIGNAL

BACKGROUND OF THE INVENTION

1. Field of the Invention

The present invention relates to a multiple-panel liquid crystal display (LCD) device and an image display system using the same. In particular, the present invention relates to a direct-view type LCD device including a multiple LCD panels by which a higher contrast ratio can be obtained. In addition, the present invention relates to an electronic apparatus, an image signal transmitter, an image data switching apparatus, an image data diagnosis apparatus, and a building, in which such a LCD device is used.

2. Description of the Related Art

LCD devices have the advantage of realizing a higher definition with a lower power dissipation and are used for a wide range of applications from a small-screen cellular phone to a large-screen television monitor. However, there is a defect in the LCD device that the contrast ratio of the LCD panel alone in a dark environment is lower than that of a CRT, that (3000:1) of a plasma display panel, which are also used as a television monitor similarly to the LCD panel, and that of a field-emission display panel called FED/SED, and is at most on the order of 1000:1. Therefore, there is pointed out the problem of insufficient feeling of live performance during representing image sources such as a motion picture having a higher power of expression especially in the dark environment.

In order to solve the above problem, there has been developed a technology for controlling the light intensity of the backlight according to the image to be displayed, thereby improving the contrast ratio on the display screen, with the contrast ratio of the LCD panel itself being left intact. In a conventional backlight unit having a surface-emission light source, however, a cold-cathode tube having a narrow dynamic range is used as the light source. Thus, improvement of the contrast ratio by controlling the light intensity of the backlight according to the image to be displayed is limited to around 2000 to 3000:1.

It is to be noted that the cold-cathode tube of the backlight unit has a shape of rod. Thus, if there are a high luminance area and a low luminance area concurrently represented on the same screen of the LCD device, the luminance of the backlight cannot be regulated area by area, resulting in a poor improvement of the contrast ratio obtained by the luminance control of the backlight. Therefore, if the image represented on the screen has a higher luminance area and yet is desired to emphasize the reproducibility in the lower luminance area, the effective contrast ratio is lowered due to the presence of the higher luminance area.

In order to solve the above problems, the contrast ratio of the LCD panel should be drastically improved. However, as described before, the contrast ratio of the LCD panel alone is at most about 1000:1. Techniques for manufacturing LCD devices capable of remarkably improving the contrast ratio thereof without improving the contrast ratio of the LCD panel itself are described, for example, in Patent Publications JP-1989-10223A and JUM-1984-189625A.

FIG. 11 shows the configuration of a LCD device having a structure of multiple-panel LCD device wherein two LCD panels are stacked one on another. The LCD device 900 includes a polarizing film 901, a LCD panel 941, a polarizing film 902, a LCD panel 942, and a polarizing film 903, which are arranged in this order from the light incidence side toward the light emitting side of the LCD device 900, i.e., the rear side toward the font side of the LCD device 900. The LCD panel 941 includes a liquid crystal (LC) layer 931 operating in a twisted-nematic (TN) mode, and a pair of transparent substrates 911 and 912 having transparent electrodes 921 and 922 on the surface thereof near the LC layer 931. The LCD panel 942 includes a LC layer 932 operating in a TN mode, and a pair of transparent substrates 913 and 914 having transparent electrodes 923 and 924 on the surface thereof near the LC layer 932. The transparent electrodes 921 and 923 of the LCD panels 941 and 942 are a pixel electrode to which a driving signal is supplied from a driving circuit 951. The transparent electrodes 922 and 924 are a common electrode. By adopting the above structure including two stacked LCD panels, when the contrast ratio is measured by using laser light, the contrast ratio, which is around 10 to 15 in the structure using a single LCD panel, can be improved up to around 100:1. Further, the contrast ratio can be improved to around 1000:1 by stacking three LCD panels. In this manner, a contrast ratio exceeding the limit of the contrast of the LCD panel alone can be realized.

Patent Publication JP-1989-10223A describes a driving scheme wherein two of the stacked LCD panels 941 and 942 are driven by the same signal supplied from a single signal source to obtain a higher contrast ratio. However, in the structure of LCD device 900, the LC layers 931 and 932 are stacked apart from each other with a distance or gap d1 in the thickness direction. Therefore, when the display screen is observed in a slanted viewing direction, a misalignment occurs in the pixel between the LCD panel 941 and the LCD panel 942. Due to this misalignment, if the observer observes the screen in a slanted viewing direction, the image will be observed as double lines, which cause the observer to feel a sense of discomfort. In addition, when two LCD panels performing color display are stacked one on another and observed in a slanted viewing direction, the light may pass through different color filters between the rear-side LCD panel and the front-side LCD panel. For this reason, there occurs a problem in that the luminance and visibility of the stacked-panel LCD device is lowered.

SUMMARY OF THE INVENTION

It is an object of the present invention to provide a LCD device having a plurality of stacked LCD panels and an image display system including the LCD device, which are capable of solving the above problems of the conventional techniques, and thereby preventing the image quality of the LCD device from lowering when observed in a slanted viewing direction.

The present invention provides, in first aspect thereof, a liquid crystal display (LCD) device including: a plurality of LCD panels stacked one on another and each including a pair of transparent substrates and a liquid crystal (LC) layer sandwiched therebetween; a pair of first polarizing films sandwiching therebetween the stacked LC panels; and at least one second polarizing film interposed between each adjacent two of the stacked LCD panels, wherein one of the stacked LCD panels includes a color filter layer, and another of the stacked LCD panels does not include a color filter layer.

The present invention, provides, in a second aspect thereof, a liquid crystal display (LCD) device including: a plurality (n)

of LCD panels stacked one on another and each including a pair of transparent substrates and a liquid crystal (LC) layer sandwiched therebetween; a pair of first polarizing films sandwiching therebetween the stacked LC panels; at least one second polarizing film interposed between each adjacent two of the stacked LCD panels, and an image data processing unit for generating a first driving signal for driving at least one of the stacked LCD panels and a second driving signal for driving another of the stacked LCD panels, the second driving signal being obtained by applying an averaging processing to the first driving signal.

The present invention provides an electronic apparatus including the LCD device of the first or second aspect of the present invention.

The present invention provides an image signal signal transmitter including the LCD device of the first and second aspects of the present invention.

The present invention provides an image data switching apparatus including the LCD device of the first or second aspect of the present invention.

The present invention provides an image data diagnosing apparatus including the LCD device of the first or second aspect of the present invention.

The present invention provides an architectural structure including the LCD device of the first or second aspect of the present invention.

The present invention provides, in a third aspect of thereof, an image display system including: a plurality of LCD panels stacked one on another and each including a pair of transparent substrates and a liquid crystal (LC) layer sandwiched therebetween; an image data processing unit which generates first image data for displaying the same on at least one of the stacked LCD panels and second image data for displaying the same on another of the stacked LCD panels, the second image data being obtained by applying an averaging processing to the first image data; a signal transmitter which transmits the image data to respective the LCD panels; and a timing controller which controls a timing for the signal transmitter to transmit the image data.

In accordance with the LCD device of the first aspect of the present invention, the configuration wherein one of the stacked LCD panels has a color filter layer and the another of the stacked LCD panels prevents the light passing through different color filters, thereby suppressing degradation of the image quality of the LCD device as viewed in a slanted viewing direction.

In accordance with the LCD device of the second aspect of the present invention, the averaging processing of the first driving signal allows the second driving signal to obscure an edge of the image displayed on the LCD device, thereby preventing the edge from being observed as double lines and thus removing the sense of discomfort upon viewing the image in a slanted viewing direction.

The above and other objects, features and advantages of the present invention will be more apparent from the following description, referring to the accompanying drawings.

DETAILED DESCRIPTION OF THE PREFERRED EMBODIMENTS

Hereinafter, embodiments of the present invention will be described in detail with reference to accompanying drawings.

First Embodiment

Figure 1:
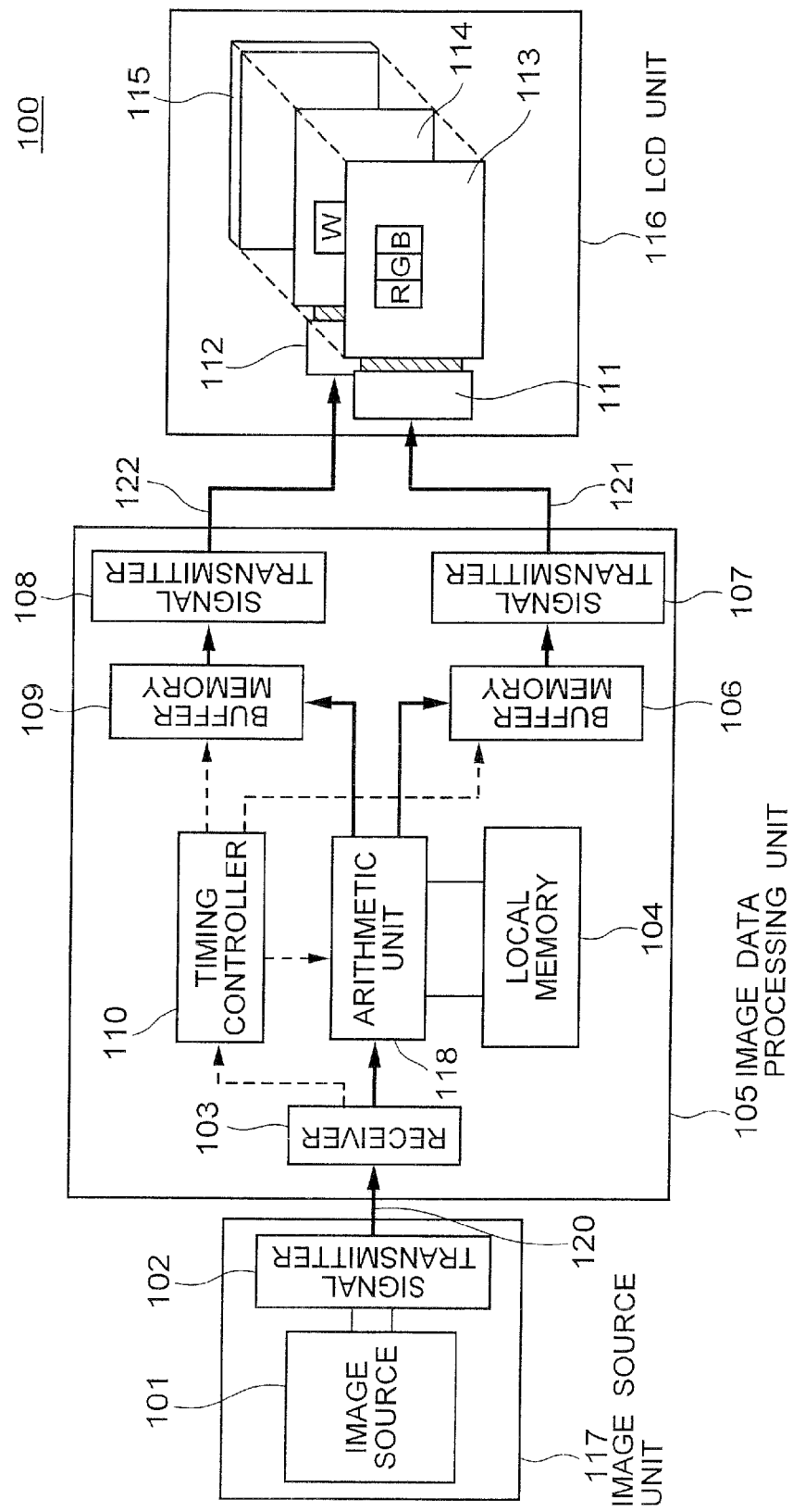
FIG. 1 is a block diagram showing a multiple-panel LCD device according to a first embodiment of the present invention together with an associated drive system.

FIG. 1 shows a two-panel LCD device according to a first embodiment of the present invention together with an associated driving system. The LCD device, generally designated by numeral 100, includes three parts, i.e. an image source unit 117, an image data processing unit 105, and a LCD unit 116 in a roughly segmented structure. Each of the three units is connected to the other units via signal cables 120 to 122. The LCD unit 116 has a plurality of stacked LCD panels (two LCD panels 113 and 114 in the example of FIG. 1). A variety of modes can be used as the display mode of the LCD panels 113 and 114. It is assumed here that the LCD panels 113 and 114 are driven by an IPS (In-Plane Switching)-mode driving scheme.

The image source unit 117 includes an image source 101 and a signal transmitter 102. The image source 101 is ordinary data such as represented by a photograph and a motion picture being reconstructed to be electronic image data by carrying out a predetermined processing. The signal transmitter 102 generates a image signal, which is transmitted to the image data processing unit 105, based on the image data supplied from the image source 101. The signal transmitter 102 transmits the generated image signal to the image data processing unit 105 via the signal cable 120. The signal transmitter 102 is configured with THC63DV164 manufactured by Thine Electronics, Inc., for example. The signal transmitter 102 converts the parallel data, output from the image source to a serial signal, and transmits the serial signal to the signal cable 120 after the conversion. It is sufficient that the signal transmitter 102 be configured to output a signal equivalent to a DVI (Digital Visual Interface) generally used as a digital interface for a personal computer. Therefore, there is no problem if the image source unit 117 is a personal computer having a DVI interface. In addition, there is no problem so long as receivers in the signal transmitter 102 and the image data processing unit 105 as a pair can send and receive a signal. Therefore, a format of the signal transmitted through the signal cable 120 is not limited to the DVI format, and can be an analog format.

The image data processing unit 105 includes a receiver 103, a local memory 104, buffer memories 106 and 109, signal transmitters 107 and 108, a timing control unit 110, and an arithmetic unit 118. The image data processing unit 105 performs a signal conversion (image processing) to the image signal received from the image source unit 117 at the arithmetic unit 118. Then, the image data processing unit 105 generates a signal for each of the plurality of the LCD panels configuring the LCD unit 116. Details of the operation of each block of the image data processing unit 105 will be described later.

The image data processing unit 105 can be configured with, for example, Spartan-3E Display Solution Board manufactured by Xilinx, Inc. to which a DVI-I/F board as an option is connected. Specifically, the DVI-I/F board is used as the receiver 103, and other blocks configuring the image data processing unit 105 are configured with the Spartan-3E Display Solution Board. In addition, an image processing logic circuit or the like is configured inside a FPGA chip (Spartan 3-E) built in the board. The input format (LVDS) of the LCD panel used for the LCD unit 116 is used for a signal output from the signal transmitters 107 and 108 on the output side.

The LCD unit 116 includes LC driving circuits 111 and 112, the LCD panels 113 and 114, and a backlight unit 115. The first LCD panel unit 113 is configured as the LCD panel performing color display. The second LCD panel unit 114 is configured as the LCD panel performing monochrome display. The order of the first and the second LCD panels 113 and 114 may be reversed. That is, the LCD panel of monochrome display may be set on a side nearer to the observer and the LCD panel of color display may be set on a side nearer to the light source.

The LC driving circuits 11 and 112 drive the first and the second LCD panels 113 and 114, respectively, based on the signal received from the image data processing unit 105. The backlight unit 115 is a flat-surface light source, and emits light to be incident onto the first and the second LCD panels 113 and 114 from the rear surface thereof. The light emitted from the backlight unit (light source) 115 is modulated in the second LCD panel unit 114 based on the driving signal input to the second LCD panel unit 114, and is incident onto the first LCD panel unit 113. The display image of the first LCD panel unit 113 is controlled based on the input driving signal. The observer observes the display image by viewing the light passing through the first and the second LCD panels 113 and 114 from the backlight unit 115.

Figure 2:
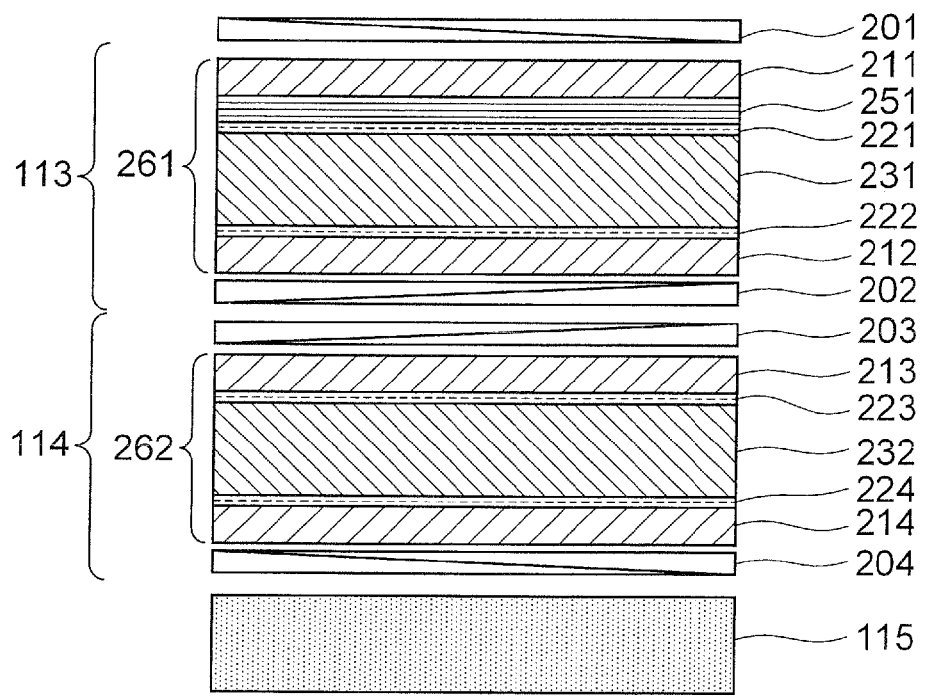
FIG. 2 is a sectional view of the LCD unit shown in FIG. 1.

FIG. 2 shows the sectional structure of the LCD unit 116. The first LCD panel unit 113 includes a polarizing film 201, a transparent substrate 211, a color filter layer 251, an orientation film 221, a LC layer 231, an orientation film 222, a transparent substrate 212, and a polarizing film 202, which are arranged in this order from the light emission side or rear side. The second LCD panel unit 114 on the backlight unit 115 includes a polarizing film 203, a transparent substrate 213, an orientation film 223, a LC layer 232, an orientation film 224, a transparent substrate 214, and a polarizing film 204, which are arranged in this order from the light emission side toward the light receiving side of the LCD panel.

In this text, for the sake of convenience, the transparent substrate 211, the color filter layer 251, the orientation film 221, the LC layer 231, the orientation film 222 and the transparent substrate 212 will be referred to as a first LCD panel 261. The first LCD panel 261 and a pair of the polarizing films 201 and 202 all together will be referred to as the first LCD panel unit 113. In addition, the transparent substrate 213, the orientation film 223, the LC layer 232, the orientation film 224 and the transparent substrate 214 will be referred to as a second LCD panel 262. The second LCD panel 261 and a pair of the polarizing films 203 and 204 all together will be referred to as the second LCD-panel unit 114.

On the surface of the transparent substrate 212 near the LC layer configuring the first LCD panel unit 113, electrode lines are arranged in a matrix, and a three-terminal non-linear element (active device, such as TFT, thus may be referred to as "TFT" sometimes) is arranged at each intersection of the electrode lines to configure the active device of a corresponding pixel. In each pixel, a pixel electrode connected to the source/drain path of a corresponding TFT and a common electrode connected to a common electrode line are formed in a comb-teeth shape. The LC layer 231 is driven in a lateral-electric-field driving scheme such as an IPS driving scheme. In the color filter layer 251, color filters of red (R), green (G), and blue (B) are arranged in stripes, and one pixel is configured by three unit pixels having R, G, and B color filters and disposed adjacent to one another.

Preparation of the first LCD panel unit 113 will be described. The orientation films 221 and 222 are formed by coating onto one of the surfaces of the transparent substrates 211 and 212, on which the color filter layer 251 or electrodes are formed, and subsequently rubbing the same for orientation of the LC layers. Thereafter, the transparent substrates 211 and 212 are arranged such that surfaces of the both transparent substrates 211 and 212 on which the orientation films 221 and 222 are formed oppose each other and that directions of the initial LC orientation are parallel or non-parallel to each other, with a specified space being provided between the opposing surfaces. In the space, LC molecules, such as ZLI14792 manufactured by Merck Ltd., are injected to form the first LCD panel 261.

Further, the polarizing films 201 and 202 configured with SEG1224 manufactured by Nitto Denko Corporation, for example, are arranged such that the first LCD panel 261 is sandwiched therebetween to form the first LCD panel unit 113. At this stage, a light transmission axes or a light absorption axes of the polarizing films 201 and 202 are arranged to cross each other at a substantially right angle, and the light absorption axis of any one of the polarizing films 201 and 202 is parallel to the LC layer 231 in the LC orientation direction.

As to the second LCD panel unit 114, electrodes are also arranged in a matrix on one of the surfaces of the transparent substrate 214 near the LC layer, and the TFT is arranged at each intersection of the electrode lines. Since the second LCD panel unit 114 does not have the color filter layer, a single pixel need not be divided into three unit pixels corresponding to R, G, and B, differently from the first LCD panel unit 113. In the second LCD panel unit 114, a single pixel is configured with one pixel, and the size of the single pixel is equivalent to the total size of three unit pixels of the first LCD panel unit 113. Alternatively, the configuration of pixels (size) of the first LCD panel unit 113 and that of the second LCD panel unit 114 may set to be the same, and three pixels of a single color may be combined together to have one pixel. In either cases, the resolution of the pixel as a unit is the same between the first LCD panel unit 113 and the second LCD panel unit 114.

Procedure for preparing the second LCD panel unit 114 is similar to the procedure for preparing the first LCD panel unit 113. The orientation films 223 and 224 are formed on one of the surfaces of the transparent substrate 213 and one of the surfaces of the transparent substrate 214 on which electrodes are arranged in a matrix, respectively. The transparent substrates 213 and 214 are arranged such that the orientation films 223 and 224 oppose each other, and a space is formed therebetween. LC molecules are then injected into the space to form the second LCD panel 262. Thereafter, the polarizing films 203 and 204 are arranged such that the second LCD panel 262 is sandwiched therebetween to form the second LCD panel unit 114. As to directions of light transmission axes or light absorption axes of the polarizing films 203 and 204, the light transmission axes or the light absorption axes of both the polarizing films cross each other at a substantially right angle, and the light absorption axis of any one of the polarizing films 203 and 204 is made parallel to the orientation direction of the LC molecules in the LC layer 232.

In the LCD unit 116, the first LCD panel unit 113 and the second LCD panel unit 114 are stacked one on another so that pixels of the first LCD panel unit 113 are aligned with corresponding pixels of the second LCD panel unit 114. At this stage of fabrication, the orientation of the LC molecules in the first LCD panel unit 113 is made parallel or perpendicular to the orientation of the LC molecules in the LC layer of the second LCD panel unit 114. In addition, the light transmission axes or the light absorption axes are made to be substantially parallel to each other between the polarizing film 202 of the first LCD panel unit 113 on the light incidence side and the polarizing film 203 of the second LCD panel unit 114 on the light incident side. Thereby, the light passed through the polarizing film 203 is allowed to pass through the polarizing film 202 of the first LCD panel unit 113 on the light incident side as much as possible.

In the present embodiment, the color filter layer is formed only on one of the plurality of LCD panels configuring the LCD device 100. Specifically, in FIG. 2, the color filter layer 251 is provided only in the first LCD panel unit 113. If the color filter layer is provided in each of the plurality of the stacked LCD panels, the incident light may pass through different color areas between the color filter layer of one of the LCD panels and the color filter layer of the other of the LCD panels due to the three-dimensional misalignment, when a viewing point is physically moved. For example, if the light passed through the color filter of red in a LCD panel unit passes through a color filter of blue in another LCD panel unit, the display luminance drastically changes depending on the viewing angle. In the present embodiment, such a situation is prevented by forming the color filter layer in a single LCD panel unit among the plurality of LCD panel units. Therefore, a situation where the display luminance largely changes depending on the viewing angle is prevented.

In the LCD device 100 of the above configuration, the distance between the observer and the LC layer of the LCD panel is different between the LCD panels. Therefore, if a plurality of stacked LCD panels are driven by the same signal supplied from a single signal source, the image quality may be degraded caused by a parallax. In view of this problem, the present invention applies an averaging processing to image data which drive the first LCD panel unit 113, to thereby compensate for the difference due to the parallax. In addition, in order to prevent the change of transmission factor caused by the application of the averaging processing, a transmission factor correction process or transmission factor adjustment process is performed for the image data which drive the second LCD panel unit 114. Hereinafter, the content of the image processings will be described in detail.

Figure 3:
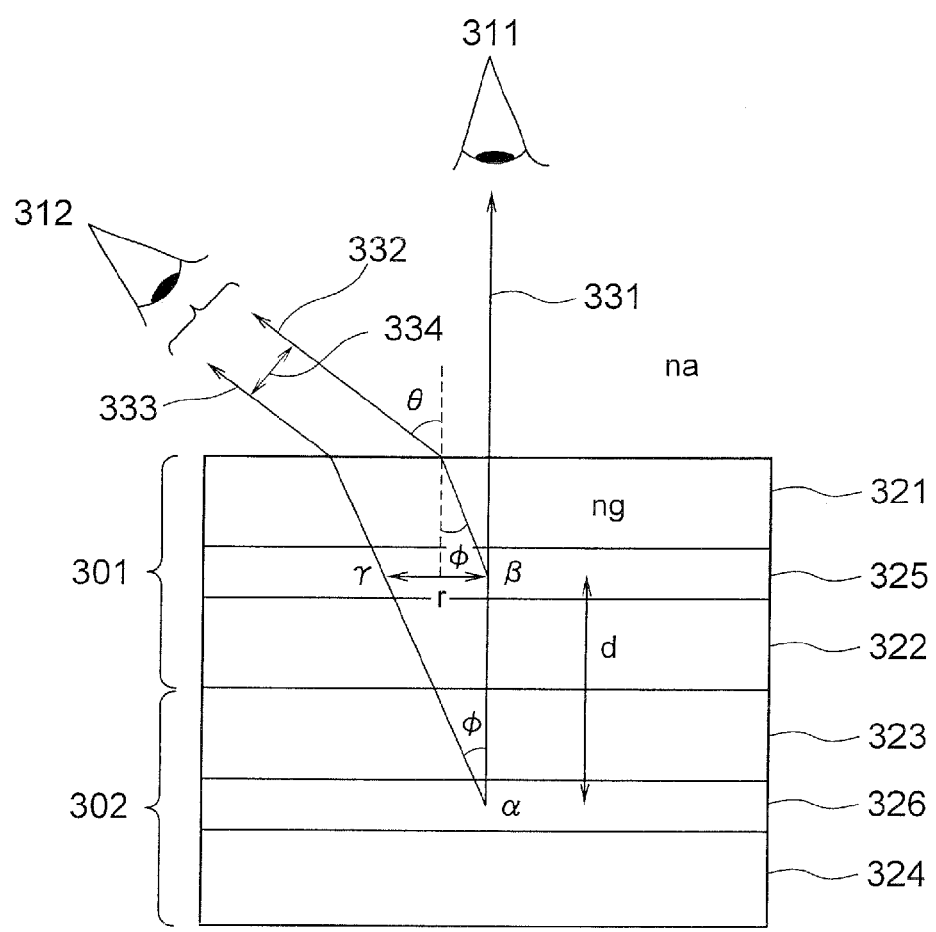
FIG. 3 is a sectional view of the principal part of the LCD unit of FIG. 2.

FIG. 3 shows a sectional view the principal part of the LCD unit 116. In FIG. 3, the transparent substrates 211 to 214 and the LC layers 231 and 232 in FIG. 2 are extracted for illustration. LC panel units 301 and 302 in FIG. 3 correspond to the LCD panels of the LCD panel units 113 and 114 shown in FIG. 2. Transparent substrates 321 to 324 correspond to the transparent substrates 211 to 214 shown in FIG. 2, respectively. In addition, LC layers 325 and 326 correspond to the LC layers 231 and 232 in FIG. 2. With reference to FIG. 3, the concept of the image processing technique of the present embodiment will be described, wherein the observer is prevented from conceiving the parallax 334 caused in the configuration where a plurality of LCD panels (LC layers) are stacked one on another. Also, a description will be made with reference to a defining method of a distance "r" to perform the averaging processing in the first LCD panel 301.

If the first and second LCD panels 301 and 302 are observed in the direction perpendicular to the LCD panels from a viewpoint 311 shown in FIG. 3, a point α of the second LCD panel 302 and a point β of the first LCD panel 301, where the same data (gray-scale level) is displayed for the first LCD panel 301 and the second LCD panel 302, are observed to be overlapping with each other, to represent a single point. Therefore, in this case, the observer does not feel a sense of discomfort. On the other hand, in a slanted viewing direction, the light passing through the point α of the second LCD panel 302 and the light passing through the point β of the first LCD panel 301, both at an angle of φ, are refracted to the direction of angle θ due to a difference in the refractive index between the transparent substrate 321 and the air, based on the Snell's law, when the lights emit to the air from the transparent substrate 321. The point α and the point β are thus separated from each other by a distance corresponding to the distance d between the point α and β in the perpendicular direction. Therefore, when both the points α and β are observed from a viewpoint 312 in the direction deviated by the angle θ from the perpendicular direction, the points α and β displaying the same image are observed at different positions apart from each other depending on the degree of the parallax 333. Therefore, the contour line of an image, for example, is observed as doubled lines to cause the observer to feel a sense of significant discomfort.

The angle θ at which the light is emitted from the transparent substrate 321 and the angle φ at which the light advances within the LC panels 301 and 302 can be expressed by the following formula:

$$na \cdot \sin\theta = ng \cdot \sin\phi,$$

where ng, na are refractive indexes of the transparent substrate and the air. By arranging this formula, the angle of direction in which the light advances in the LCD panels 301, 302 is expressed by:

$$\phi = \sin^{-1}((na/ng) \times \sin\theta).$$

From those relationships, the apparent distance, or deviation r, by which the position α in the second LCD panel 302 and the position β in the first LCD panel 301 are observed apart from each other in the slanted viewing angle θ is expressed by the following formula:

$$\tan\phi = (r/d) \tag{1}$$
$$r = d \times \tan\phi$$
$$= d \times \tan(\sin^{-1}((na/ng) \times \sin\theta))$$

In order to eliminate the parallax 333 in the slanted viewing angle θ, the data which is to be originally displayed at the position β displayed by shifting the position from the original position β to a position γ shown in FIG. 3. For this reason, the arithmetic unit 118 performs the averaging processing to disperse the data at point β by the distance "r" for the entire screen, with respect to the signal to drive the first LCD panel 301. In this manner, effect of the parallax can be reduced and the observer does not feel a sense of discomfort. In the present embodiment, the averaging processing is performed for the first LCD panel 301 having the color filter layer 251 (FIG. 2). However, the averaging processing can be performed for the second LCD panel 302 which does not have the color filter layer. In addition, the LCD panel for which the averaging processing is performed need not be arranged in the front side nearer to the observer, and there is no particular influence if such a LCD panel exists on the rear side of the LCD device.

In the averaging process, image data of pixels existing within an area of a predetermined distance measured from a focused pixel is simply averaged. In the averaging process, for example, the image data in a range surrounded by a rectangular area having vertical and horizontal sides extending for the distance r from coordinates of the focused pixel is averaged. For the averaging process, a method of simply averaging the image data within the area may be adopted. In an alternative, the averaging processing can be performed after the weighting is carried out corresponding to the distance from the focused pixel so that the central part of the area assumes a larger weight in the averaging. In this weighting technique, a Gaussian distribution can be used. In addition to the Gaussian distribution, a weighting technique using a mere inclination distribution, a quadratic curve or a quartic curve may be adopted.

Figure 4:
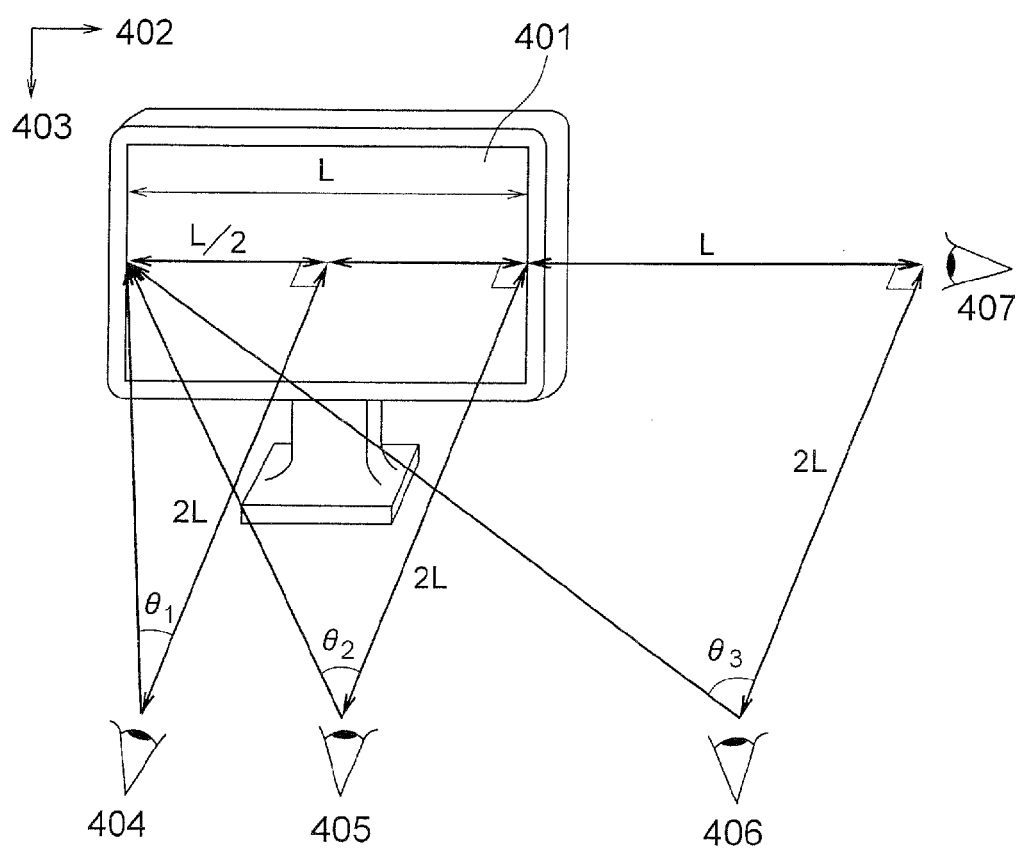
FIG. 4 is a schematic view showing the positional relationship between the LCD device configured as a TV monitor and the observer.

The range of area in which the averaging processing is to be performed should be changed depending on to what extent the range of angle θ is assumed. Calculation to obtain the range of area in which the averaging processing is to be performed will be described with reference to FIG. 4. Here, the length of a longitudinal direction (direction 402 shown in FIG. 4) of a LCD device 401 is assumed to be L, the LCD device 401 is observed from a point which is apart from the LCD device 401 by the double of length L (i.e., 2×L) of the screen in a horizontal direction. A viewpoint 404 is the central viewpoint at which the LCD device 401 is observed from the front center, and the distance between the viewpoint 404 and the center of the screen of the LCD device 401 is 2×L. It is assumed here that a position, which is located at the center as viewed in the vertical direction (direction 403) of the LCD device 401 and at an edge as viewed in the horizontal direction thereof, is observed from the viewpoint 404. Angle θ1 between the direction toward the center of the screen from the viewpoint 404 and the direction toward the edge on the side of the display screen from the viewpoint 404 can be expressed by the following formula:

$$\theta 1 = \tan^{-1}((L/2)/2L) \quad (2)$$

In order to prevent a sense of discomfort caused by the parallax when the edge of the screen is observed from the viewpoint 404, θ1 of the formula (2) is substituted into θ of the formula (1), and the averaging processing can be performed in the range of a distance r1 obtained by:

$$r1 = d \times \tan(\sin^{-1}((na/ng) \times \sin(\tan^{-1}((L/2)/2L)))) \quad (3)$$

The range in which the averaging processing is performed is set to be the range of distance r1 obtained by the above formula (3), whereby the sense of discomfort caused by the parallax upon observing the screen of the LCD device 401 from the viewpoint 404 on a front side can be reduced. However, in this case, when the viewpoint is shifted to left or right from the viewpoint 404 located at the center, the angle between the direction toward the LCD device 401 from the viewpoint and the direction toward the horizontal edge of the screen from the viewpoint will be larger than θ1, and the sense of discomfort caused by parallax still occurs. In order to prevent the sense of discomfort when the LCD device 401 is observed from any viewpoint with respect to the screen, the distance in which the averaging processing is performed should only be a distance corresponding to an angle θ2 when an edge of the screen in a horizontal direction is observed from a viewpoint 405 on the opposite in the horizontal direction. In this case, θ2 can be expressed by the following formula:

$$\theta 2 = \tan^{-1}(L/2L).$$

In order to prevent the sense of discomfort caused by parallax when the edge of the screen in the horizontal direction is observed from the viewpoint 405, the averaging processing should only be performed in the range of a distance r2 obtained by:

$$r2 = d \times \tan(\sin^{-1}((na/ng) \times \sin(\tan^{-1}((L/2L)))).$$

If a LC television set is considered as the LCD device 401, a viewpoint does not always exist within the range of the display screen. In this case, a viewpoint 406 apart from an edge of the screen by a distance L is assumed, and the distance for performing the averaging processing should only be a distance corresponding to an angle θ3 upon observing the opposite edge of the LCD device 401 in the horizontal direction from the viewpoint 406. The angle θ3 is obtained by:

$$\theta 3 = \tan^{-1}(2L/2L) = 45°.$$

The distance r3 for performing the averaging processing can be obtained by:

$$r3 = d \times \tan(\sin^{-1}((na/ng) \times \sin(45°))).$$

In addition, in order to prevent the sense of discomfort when the LCD device 401 is observed from any direction, a viewpoint 407 for observing the screen from a position on an extended line in a horizontal direction is assumed, and the distance for performing the averaging processing should only be a distance corresponding to an angle of 90 degrees when the LCD device 401 is observed from the viewpoint 407. The distance r4 for performing the averaging processing in this case is obtained by:

$$r4 = d \times \tan(\sin^{-1}(na/ng))$$

The distance "r" for performing the averaging processing obtained as above is constant regardless of a pitch of the pixels of the LCD panel. Assuming that the area necessary for displaying a single pixel image is set as a pixel, and that the distance for performing the averaging processing is r and the pixel pitch which is a distance between two pixels adjacent to each other in a horizontal direction or a vertical direction is pp, the averaging processing should only be performed in the range from a focused pixel to pixels apart from the focused pixel by np=r/pp in a vertical direction. For the averaging process, if the image data is divided into a luminance component and a color component, the averaging processing may be performed using different distances r for the respective components.

Back to FIG. 1, the above averaging processing is performed in the arithmetic unit 118. The receiver 103 recovers the image signal input from the image source unit 117 via the signal cable 120. The receiver 103 delivers the recovered image signal to the arithmetic unit 118. The arithmetic unit 118 has a local memory 104 for storing therein the input image signal, and carries out storing of the image and image processing simultaneously. The local memory 104 has at least (np×2+1) line memories, and preferably includes a frame memory. The arithmetic unit 118 generates data for driving each of the first and the second LCD panels 113 and 114. The arithmetic unit 118 transmits a signal for driving the LCD panels 113 and 114 to the LCD unit 116 via the buffer memories 106 and 107, the signal transmitters 107 and 108, and the signal cables 121 and 122. At the time of signal transmission, a signal averaged for a range of pixels which are the distance r or the number of pixels np apart from the focused pixel is transmitted to the first LCD panel unit 113.

Whether or not the effective range of the averaging processing applied to the first LCD panel unit 113 is the same as the set range can be confirmed by the following steps. For example, while allowing the second LCD panel unit 114 to be in the state of full transmission, only the first LCD panel unit 113 is driven, and two stripes having different gray-scale levels, such as a luminance of 25 and a luminance of 75 are displayed extending in the vertical or horizontal direction with the width of each of the stripes having the same width W. In this example, the notation of the gray scale levels is that a maximum luminance at the full transmission is 100 and a minimum luminance at the full shielding is 0. Luminance T1 at a position where the luminance is the highest on the screen and luminance T2 at a position where the luminance is the lowest are measured, and the ratio thereof is defined as CR1 (=T1/T1). When the width W of the stripe is sufficiently larger than the distance r for performing the averaging process, CR1 does not change even if the width W is made narrower. However, when a condition of W=2×r is met, a value of CR1 starts to fall by the range of the averaging processing exceeding the width W. Therefore, by observing the lowering of the CR1, whether or not the effective range of the averaging processing is same as the set range can be confined on the screen.

Figure 5A:
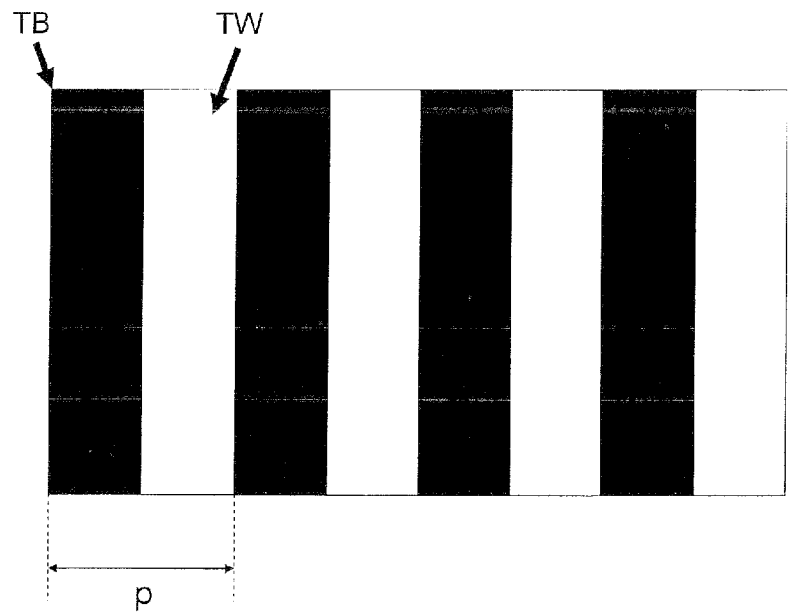
FIG. 5A shows an example of image before an averaging process.
Figure 5B:
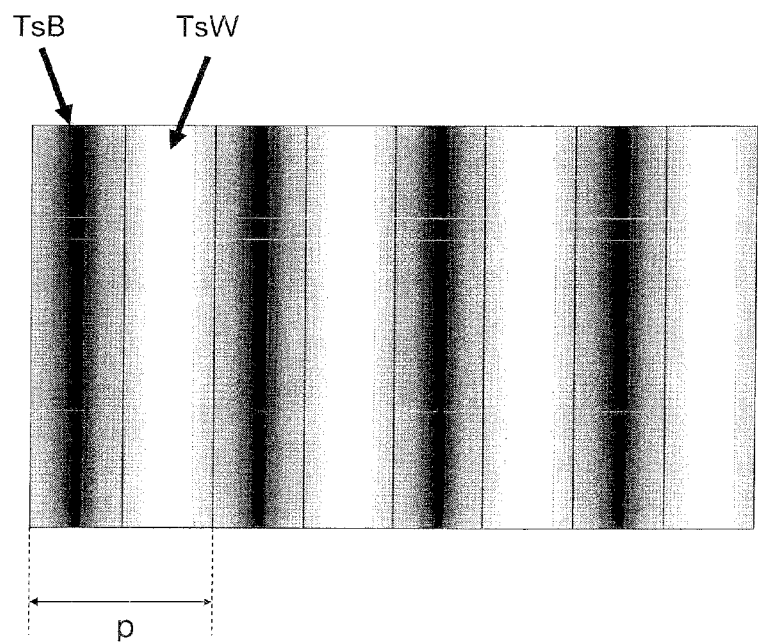
FIG. 5B shows the image after the averaging process.

FIG. 5A shows an example of the image before the averaging process. FIG. 5B shows the image after the averaging process. As the image to be subjected to the averaging process, as shown in FIG. 5A, an image is exemplified in which two different gray scale levels, i.e., a luminance of 100 and a luminance of 0 assuming that the luminance of full transmission is 100 and the luminance of full shielding is 0, are arranged alternately in a spatial period "p" in the form of two stripes having the same width. The gray scale level of the stripe which has a higher luminance in the image is expressed as TW and the gray scale level of the stripe which has a lower luminance is expressed as TB in FIG. 5A. When the averaging processing is applied to the image of FIG. 5A, as shown in FIG. 5B, the position having a higher degree of change of gray scale levels is obscured, whereby the total image has gray scale levels moderately and smoothly changing across the stripes. It is assumed here that the luminance of the position having the highest luminance in the image is TsW and the luminance of the position having the lowest luminance is TsB. In the range where the distance r for performing the averaging processing is sufficiently smaller compared to the period p, the above luminance TW and TsW are substantially equal, and the luminance TB and TsB are substantially equal, whereby the value expressed by the following formula:

(TsW−TsB)/(TW−TB)

assumes "1".

Figure 6:
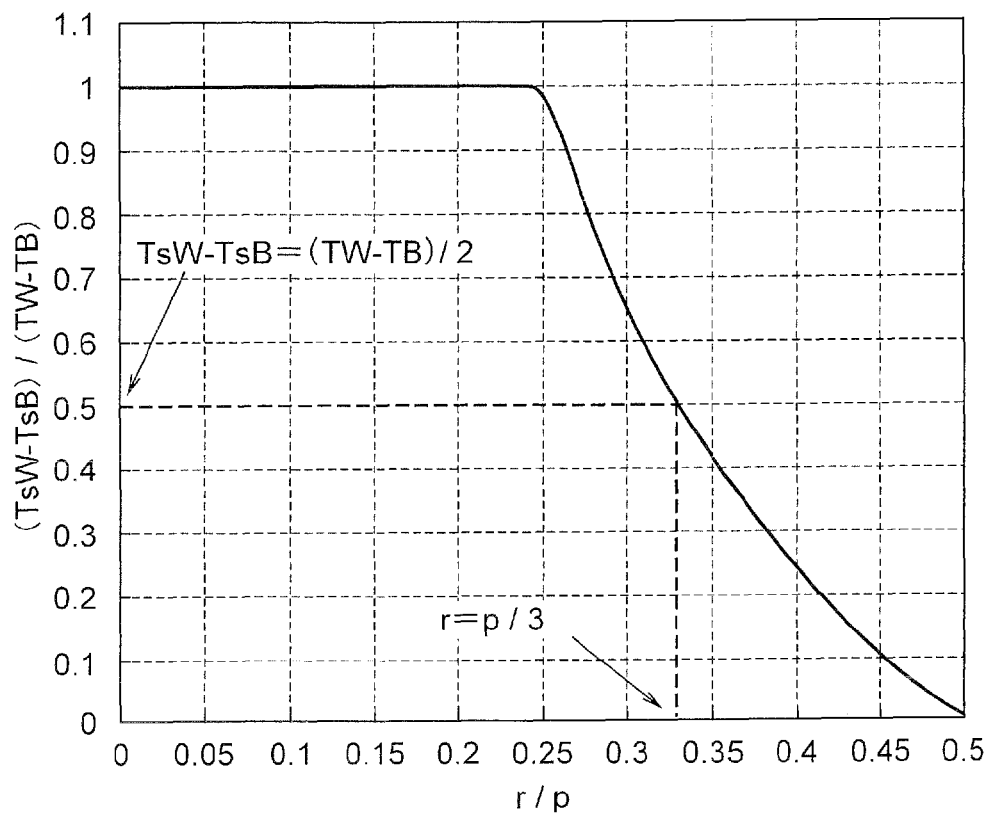
FIG. 6 is a graph showing the relationship between a distance r to perform the averaging processing and a value of (TsW−TsB)/(TW−TB)

FIG. 6 shows the relationship between the distance r for performing the averaging processing and the value of (TsW−TsB)/(TW−TB). When the distance r for performing the averaging processing is smaller than ¼ of the period p of the stripe, the range of the averaging processing at the central position of the stripe having a luminance of 0 is within the stripe of luminance 0. In addition, the range of the averaging processing at the central position of the stripe having a luminance of 100 is within the stripe of the luminance 100. Therefore, even if the distance r for performing the averaging processing is changed, the value of (TsW−TsB)/(TW−TB) remains at "1" and is unchanged. When the distance r for performing the averaging processing exceeds ¼ of the period p, the value of (TsW−TsB)/(TW−TB) starts to fall because the luminance 0 and the luminance 100 are mixed. The degree (or slope) of the reduction in the value of (TsW−TsB)/(TW−TB) with respect to an increase in the range of performing the averaging processing changes depending on the weighting in the averaging process, that is, the degree of influence depending on a peripheral pixel or a central pixel. In the present embodiment, for example, when the averaging processing is performed with respect to the distance r for the case r=3/p, the averaging processing in which the value of (TsW−TsB)/(TW−TB) is 0.5 is adopted.

If the first LCD panel unit 113 displays the averaged image, the image may be observed to be blur or obscured, as viewed even from the front center, due to the averaging process, whereby the entire image lacks a sense of sharpness. For this reason, the arithmetic unit 118 applies an image processing, herein referred to as transmission-factor correcting processing, for correcting the transmission factor changed by the averaging processing to the image to be displayed on the second LCD panel unit 114. Thereby, the transmission factor of the second LCD panel unit 114 is controlled so as to obtain the original gray-scale-level characteristics which are obtained before the averaging processing is applied to the first LCD panel unit 113. The image processing applied by the arithmetic unit 118 to the second LCD panel unit 114 is typically an image processing to emphasize the edge portion of an image. Here, for the sake of convenience, such an image processing is expressed as an edge emphasizing processing.

In the edge emphasizing processing, the total transmission factor of a pixel is assumed to change from Ta to Ta+α(α>0 or α<0) by the averaging processing applied onto the first LCD panel unit 113. In this case, the arithmetic unit 118 changes the transmission factor of the pixel in the second LCD panel unit 114 for an amount corresponding to β so that the transmission luminance of the light passed by the second LCD panel unit 114 and the first LCD panel unit 113, for the latter of which the averaging processing is applied, is assumes Ta which is the luminance before the averaging processing is applied. In this manner, the total transmission factor on a front viewing area can be made equal to the transmission factor before the averaging processing is applied, although the first LCD panel displays thereon the image to which the averaging processing is applied.

To what extent the edge emphasizing processing has been performed in the image of the second LCD panel unit 114 can be examined by the following procedure. For example, when the first LCD panel unit 113 is assumed to be in the state of full transmission, only the second LCD panel unit 114 is driven such that two gray scale levels, for example, a luminance of 25 and a luminance of 75 are displayed in two stripes having the same width W, assuming that the luminance of the full transmission is 100 and the luminance of the full shielding is 0. Here, the luminance at the central position of the higher-luminance stripe in the second LCD panel unit 114 is assumed as U1, and the luminance at the central position of the lower-luminance stripe is assumed as U2. In addition, the luminance at a position having the highest luminance on the screen is assumed as U3 and the luminance at a position having the lowest luminance is assumed as U4. Before the edge emphasizing processing is applied in the second LCD panel unit 114, the following formula is established:

$U1/U2=U3/U4.$

If the edge emphasizing processing is applied in the second LCD panel unit 114, the formula changes into the following relationship:

$$U1/U2 < U3/U4.$$

Therefore, by comparing the value of U1/U2 against the value of U3/U4, to what extent the edge emphasizing processing is applied in the second LCD panel unit 114 can be determined by the image displayed on the screen.

The timing control unit 110 adjusts the transmission timing of the image signal so that the image is displayed on the first and the second LCD panels 113 and 114 in the same timing, in consideration of the processing delay time in the averaging processing and the edge emphasizing process. In addition, the timing control unit 110 delivers Vsync, Hsync and DotClock signals required for display in the first and the second LCD panels 113 and 114 to the first and the second LCD panels 113 and 114. The timing control unit 110 controls the timing of the entire device, whereby the image display on the first and the second LCD panels 113 and 114 can be synchronized.

The contrast ratio of each of the first and the second LCD panels 113 and 114 alone used in the present embodiment is around 700:1. In the present embodiment, by stacking the first and the second LCD panels 113 and 114 one on another, the contrast ratio of the LCD device 100 can be significantly improved up to around 500,000:1. In addition, in the present embodiment, any one of the stacked first and second LCD panels 113 and 114 displays the averaged image in which a portion, such as the edge portion, having a higher differential value of the spatial luminance is made obscure or inconspicuous. The sense of a person tends to focus on the portion where a stimulus value significantly changes. Therefore, the observer pays attention on the detailed image displayed on the second LCD panel unit 114 in which the edge portion is not blurred. For this reason, the LCD panel displaying the averaged image contributes to the contrast of the entire screen, and yet the observer does not pay a significant attention on such a LCD panel. In this manner, the sense of discomfort caused by a parallax when the observer observes the screen at a slanted angle can be reduced.

If an image to which the averaging processing is applied is displayed on any of the first and the second LCD panels 113 and 114, a broader range of applying the averaging processing will increase the angle of the viewing area in which the sense of discomfort caused by a parallax is not generated. However, in the front view, the image is made to have a blurred impression as a whole due to the edge portion of the displayed image being blurred. In the present embodiment, one of the first and the second LCD panels 113 and 114 which does not display an averaged image displays the image in which the transmission factor compensation processing is applied, so as to compensate the change of the transmission factor effected by the averaged image. In this manner, the blurred impression caused by the averaged image is resolved, and at the same time, the observer's attention is paid on the non-averaged image, whereby the sense of discomfort caused by a parallax can be resolved.

In FIG. 1, the image source unit 117, the image data processing unit 105, and the LCD unit 116 are illustrated in separate configurations. However, these units need not be configured by separate items of hardware. These three units may exist in a common housing. In addition, the configuration may be such that the image source unit 117 and the image data processing unit 105 exist in a common housing and the LCD unit 116 exists in a different housing. Alternatively, the configuration may be such that the image data processing unit 105 and the LCD unit 116 exist in a common housing and the image source unit 117 exists in a different housing. In the present invention, special features exist in the arrangement of the color filter layer in the LCD unit 116 and an image processing for the image data on the stacked LCD panels. Therefore, the advantages of the present invention are not impaired irrespective of whether the above units are received in a housing or housings.

As for the image processing performed by the image data processing unit 105, image processing using hardware is adopted in the present embodiment, and image processing performed by software can be adopted as well. In addition, the averaging processing and the edge emphasizing processing are not necessarily be performed by a single image data processing unit. The averaging processing and the edge emphasizing processing can be performed by the image source unit 117 which performs software processing using a CPU and processing using a graphic chip represented by an MPEG decoder. In this case, the signal cable 120 which has a single signal line in FIG. 1 is duplicated, and an image to be displayed on the first LCD panel unit 113 and an image to be displayed on the second LCD panel unit 114 need only be output from the image source unit 117.

The above embodiment exemplifies that the first LCD panel unit 113 is configured to have the color filter layer 251 (FIG. 2), and a single pixel receiving a single image data in the first LCD panel unit 113 is divided into three unit pixels (or areas) corresponding to the color filters of RGB. However, the color filter layer is not an indispensable constituent element with respect to the resolution of the sense of a parallax during display of the averaged image. Therefore, the first LCD panel unit 113 can be configured as a monochrome type LCD panel similarly to the second LCD panel unit 114. In addition, colors of the color filter layer are not limited to three colors, i.e. R, G, and B. A multicolor filter layer, such as one including RGBYMC colors, can be used as well. In this case, a single pixel should only be divided into a number of areas corresponding to the number of colors in the color filter layer. Moreover, a single pixel can be divided into four areas, and each area can be made corresponding to R, G, G, B colors. Alternatively, the four areas can be configured with three areas each corresponding to one of RGB colors and a single area which does not have a color (W).

In the above embodiment, the IPS-mode LCD panel is exemplified for describing the LC driving mode. However, the LC driving mode is not limited to this type of the LC mode. For example, a variety of modes, such as a vertical-orientation (VA) LC mode, a twisted-nematic (IN) LC mode, and an optically compensated birefringence (OCB) LC mode, can be adopted. In addition, in FIG. 2, the configuration is such that a retardation compensation layer is not provided between the LCD panels 261 and 262 and the polarizing films 201 to 204. However, if the retardation compensation layer is provided in this portion, the advantages of the present invention are not impaired.

When the retardation compensation layer is inserted, optical characteristics, etc. of the retardation compensation layer to be inserted are set in accordance with a combination with the LC mode of the LC layer. For example, if the retardation compensation layer is inserted in the first LCD panel unit 113 driven by the IPS mode, the retardation compensation layer is inserted between the polarizing films 201 and 202 and the LCD panel 261 in the following manner: if the refractive index in a direction where the refractive index is the highest is nx, the refractive index in a direction crossing the direction of nx on a plane parallel to the substrate is ny, and the refractive index in a direction perpendicular to nx and ny is nz, the retardation compensation layer having characteristics of nx≧nz>ny is inserted in parallel to the light absorbing axis or the light transmitting axis of the polarizing films 201 and 202. In this manner, viewing angle characteristics of the first LCD panel unit 113 can be improved.

If the first LCD panel unit 113 is driven by the VA mode, the retardation compensation layer having characteristics of nx≧nz>ny is inserted so that the nx direction is in parallel to the light absorbing axis or the light transmitting axes of the polarizing films 201 and 202, whereby the viewing angle characteristics can be improved. If the first LCD panel unit 113 is driven by the TN mode or the OCB mode, a wide view film is inserted as the retardation compensation layer, whereby the viewing angle characteristics can be improved. The wide view film includes a discotic LC layer having a negative retardation, and the orientation angle of the discotic LC layer continuously changes in the thickness direction.

The retardation compensation layer can be inserted on one surface of the LCD panels 261 and 262, or on both surfaces thereof. In the above configuration, the position for insertion of the retardation compensation layer is set between the LCD panels 261 and 262 and the polarizing films 201 to 204. In practice, the position for insertion can be any position so long as the position is between the LC layers 231 and 232 and the polarizing films 201 to 204. In addition, the number of the retardation compensation layers to be inserted is not limited to one, and a plurality of retardation compensation layers may be inserted.

Second Embodiment

Figure 7:
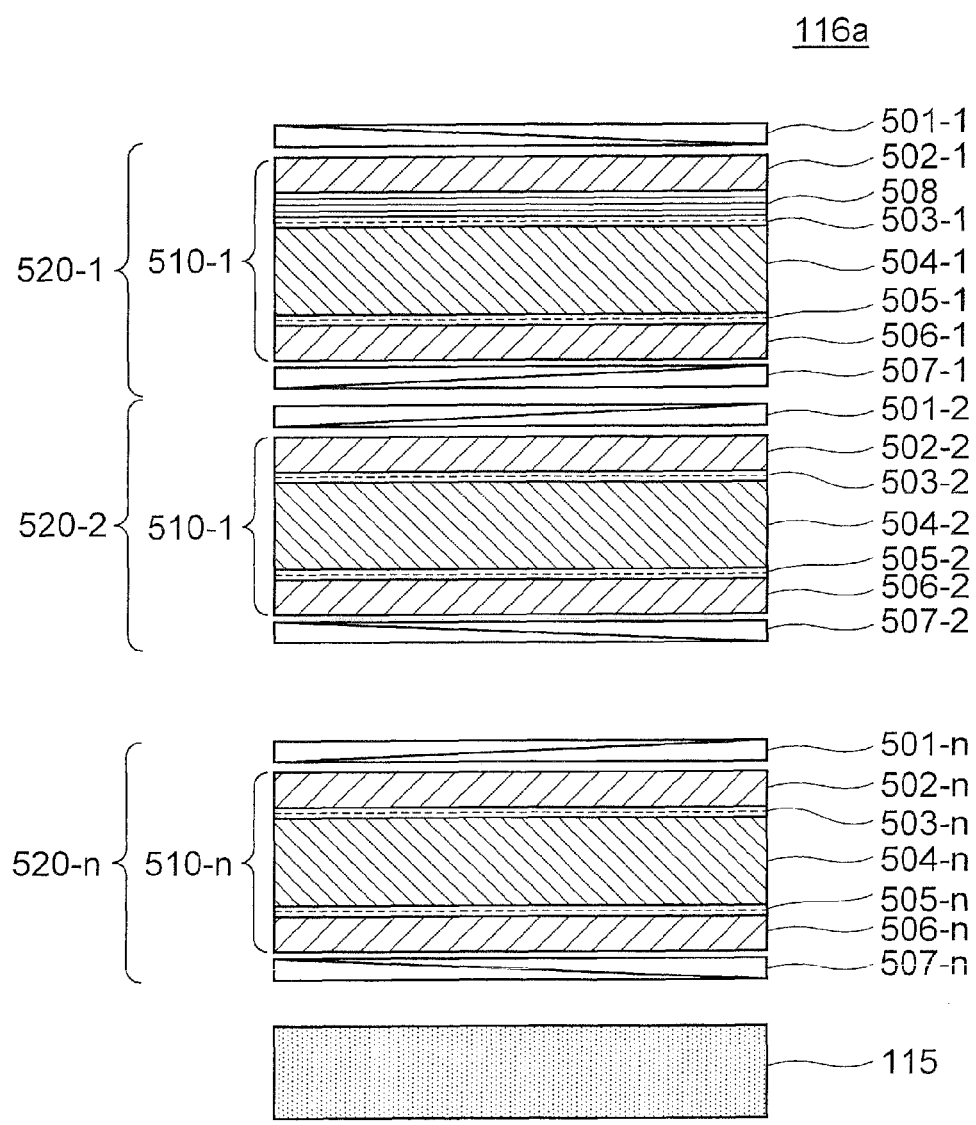
FIG. 7 is a sectional view of a LCD unit in a multiple-panel LCD device according to a second embodiment of the present invention.

FIG. 7 shows the sectional structure of a LCD unit in a multiple-panel LCD device according to a second embodiment of the present invention. In the first embodiment, as shown in FIG. 2, if the contrast ratio of the LCD panel alone is x:1, a contrast ratio of around $x^2$:1 can be obtained by stacking together the two LCD panels 113 and 114. In the present embodiment, in order to obtain a higher contrast ratio, n LCD panel units 520-1 to 520-$n$ are stacked one on is another, as shown in FIG. 7. In this case, a contrast ratio of around $X^n$:1 can be obtained.

Each of n LCD panel units 520 configuring the LCD unit 116$a$ includes a LCD panel 510, and a pair of polarizing films 501 and 507 sandwiching therebetween the LCD panel 510. Each of the LCD panels 510 has a pair of transparent substrates 502 and 506, a LC layer 504 sandwiched between the pair of transparent substrates 502 and 506, and alignment films 503 and 505 disposed adjacent to the LC layer 504. In addition, a first LCD panel 510-1 has a color filter layer 508 in addition to the above. On the rear side of the n-th LCD panel 520-$n$ located on the bottom of the LCD unit 116$a$, a backlight unit 115 is arranged. The first LCD panel unit 520-1 has a configuration similar to the configuration of the first LCD panel unit 113 in FIG. 2. The second to n-th LCD panel units 520-2 to 520-$n$ have a configuration similar to the configuration of the second LCD panel unit 114 in FIG. 2.

Figure 8:
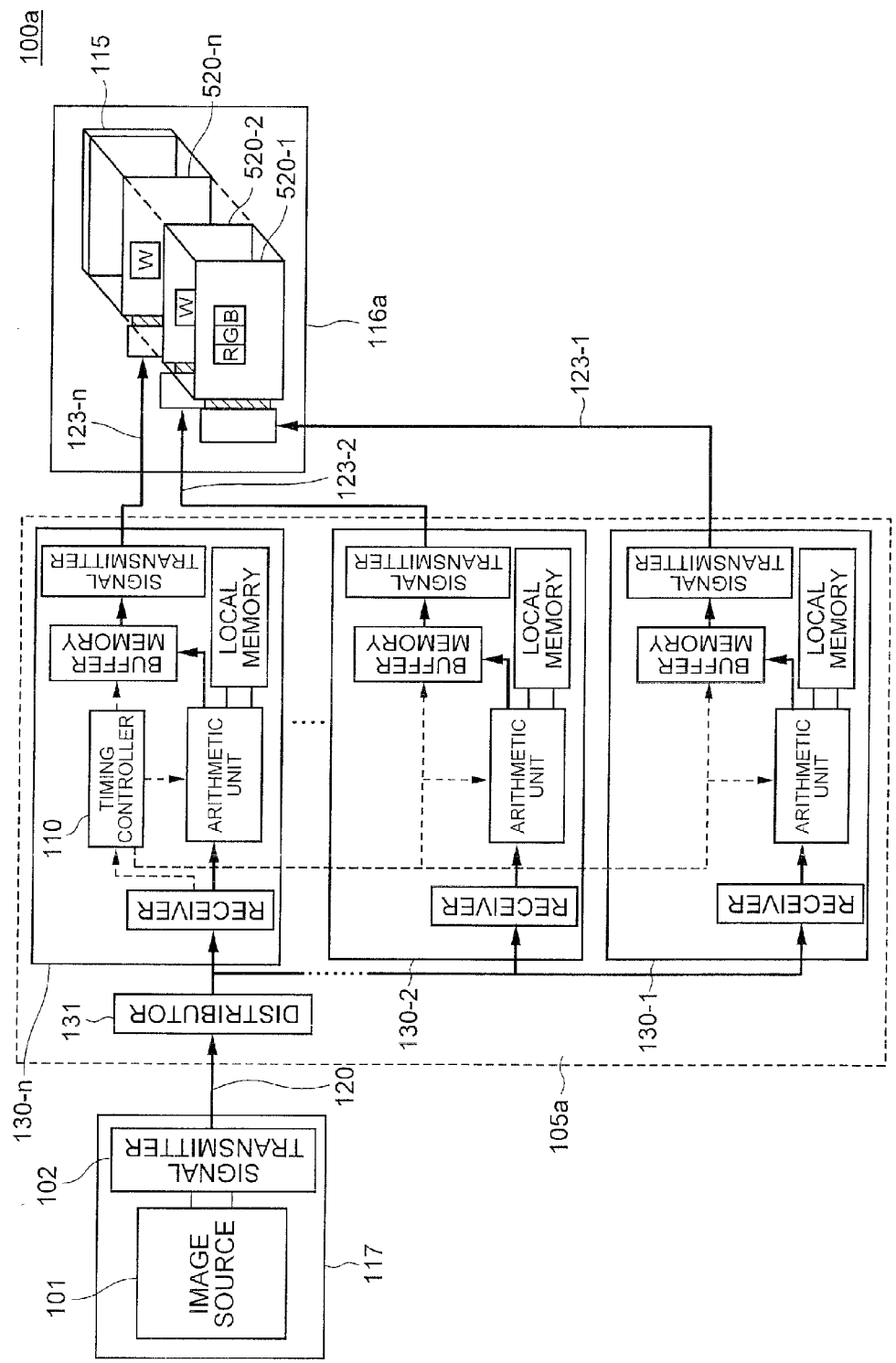
FIG. 8 is a block diagram of the LCD device of the second embodiment together with an associated drive system.

FIG. 8 shows the LCD device 100$a$ of the second embodiment together with an associated driving system in a perspective view. In the present embodiment, an image data processing unit 105$a$ has n image data processing blocks 130-1 to 130-$n$ corresponding to the n LCD panel units 520-1 to 520-$n$, respectively, of the LCD unit 116$a$. The image data processing blocks 130 have the configuration similar to the image data processing unit 105 in FIG. 1. The image data processing blocks 130 each receive the image signal from the image source unit 117 via a distributor 131, and generate a signal for driving the corresponding LCD panel 520. The image data processing blocks 130 each deliver the generated driving signal to the LCD unit 116$a$ via a corresponding signal cable 123. For the image data processing units 130, for example, Spartan-3E Display Solution Board can be used. A timing control unit of any of the n image data processing blocks 130, that is, the timing control unit 110 of the image data processing unit 130-$n$ in the example of FIG. 8, controls the timing of each of the image data processing blocks 130 outputting a signal to the LCD unit 116$a$, and synchronizes the image displayed on each of the LCD panel 520.

In the LCD unit 116$a$, the edge emphasizing processing is carried out in the second LCD panel 520-2, and the averaging processing is carried out in other LCD panels 520. In each of the LCD panels 520 excluding the second LCD panel 520-2, a distance in which the averaging processing is carried out can be a value corresponding to the distance between the position of the LC layer of the LCD panel 520-1 located on the top and the position of the LC layer of the LCD panel 520-$n$ located on the bottom. In addition, any edge is made inconspicuous by the averaging processing in the third to the n-th LCD panels 520-3 to 520-$n$, and thus hard to be visually recognized by the observer. For this reason, the distance may be a value corresponding to another distance between the position of the LC layer of the first LCD panel 520-1 and the LC layer of the second LCD panel 520-2. In any case, the sense of discomfort caused by a parallax when observed in a slanted viewing direction can be resolved.

In the present embodiment, the LCD unit 116$a$ in which the n LCD panel units 520 are stacked one on another is employed. In this manner, a higher contrast ratio can further be obtained. In addition, at least one of the n LCD panels 520 displays the averaged image, whereby the sense of discomfort caused by a parallax in a slanted viewing direction can be resolved. Further, at least one of the LCD panels for which the averaging processing is not performed among the n LCD panels 520 displays an image in which the edge emphasizing processing (transmission-factor correcting processing) is applied, whereby the change of a transmission factor in a front view due to an existence of the LCD panel displaying the averaged image can be controlled.

In the present embodiment, an example that the second LCD panel 520-2 displays the image in which the edge emphasizing processing is applied is shown. However, the present invention is not limited thereto, and other LCD panel units 520 disposed at different positions may display the image in which the edge emphasizing processing is applied. In addition, the averaging processing or the edge emphasizing processing need not be applied in all layers, and there may be a LCD panel unit 520 among the LCD panel units which displays an image in a normal manner. In an image data processing unit 105$a$, the image data processing unit 130 is provided corresponding to each of the LCD panels 520. However, the present invention is not limited thereto, and the image data processing unit 130 may correspond to any number of the LCD panels 520.

A verification test was carried out by preparing the LCD devices corresponding to the first and the second embodiments, for confirming the advantages of the present invention. In the verification test, all of the LCD panels were provided as the IPS-mode LCD panels. However, the present invention is not limited to this mode, and a variety of modes, such as the VA LC mode, the TN LC mode, and the OCB LC mode, can be applied. In the LCD devices using other than the IPS mode, the transparent electrode is prepared on the transparent substrate on the surface thereof on which the TFTs are not formed, and an electric field is applied in a direction perpendicular to the substrate by electric charge, thereby driving the LC layer.

Third Embodiment

Figure 9:
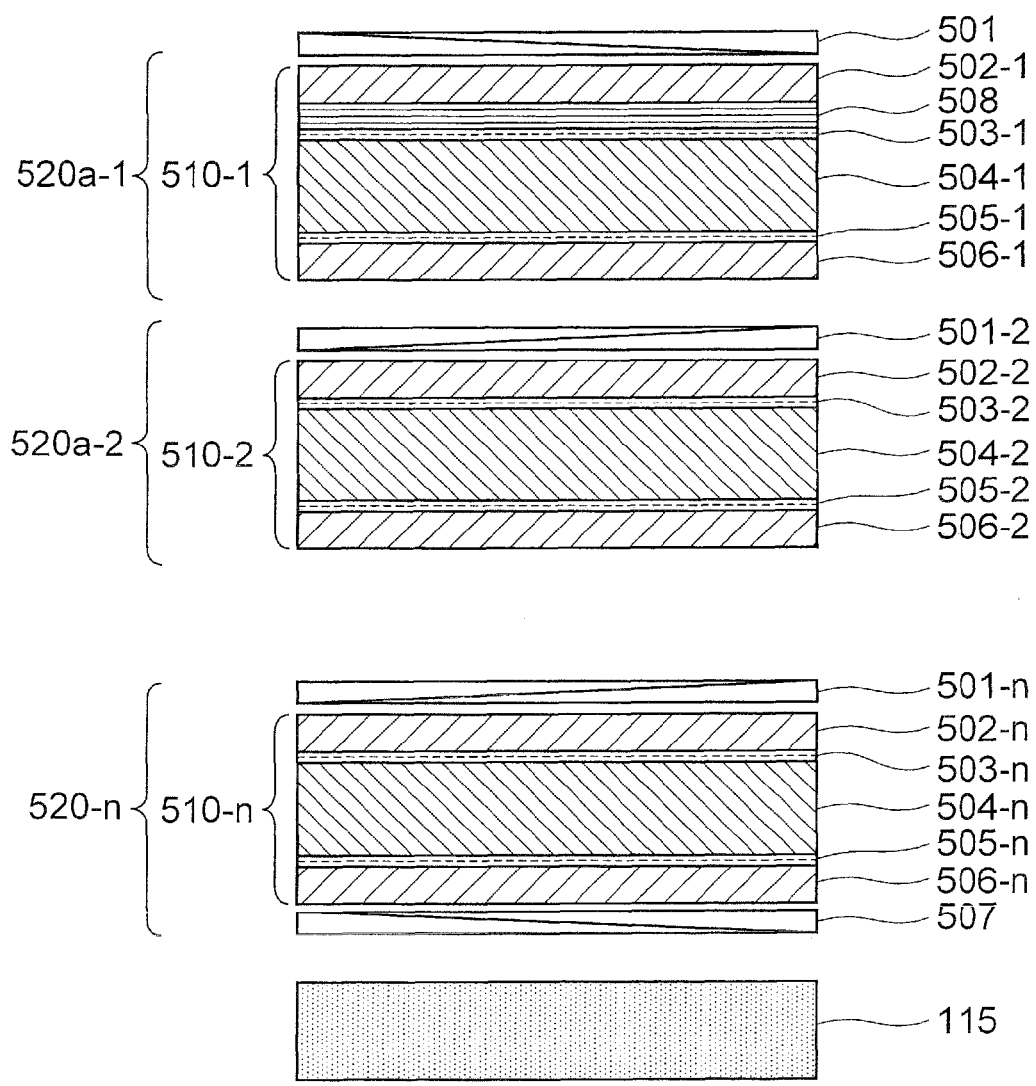
FIG. 9 shows the sectional structure of a LCD unit in the LCD device according to a third embodiment of the present invention.

FIG. 9 shows the sectional structure of a LCD unit in a multiple-panel LCD device according to a third embodiment of the present invention. In the above embodiment shown in FIG. 7, for example, each of the LCD panel units 520 is configured with the LCD panel 510 and a pair of polarizing films 501 and 507 sandwiching therebetween the LCD panel 510. In this case, the two polarizing films 501 and 507 are arranged between two of the adjacent LCD panels 510. The optical transmission axes or the optical absorbing axes of the two polarizing films are parallel to each other, and light absorption by the two polarizing films is made minimum. In the LCD unit 116b of the present invention, as shown in FIG. 9, the n-th LCD panel 520-n located on the bottom has a configuration similar to the configuration shown in FIG. 7. As for the LCD panel units 520a other than the n-th LCD panel unit 520-n, a polarizing film corresponding to the polarizing film 507 on the rear side of the LCD panel is omitted, and the number of polarizing films arranged between two adjacent LCD panels 510a is one.

In the present embodiment, one of the polarizing films in the LCD panels 520a other than the LCD panel 520 located on the bottom is omitted. In this manner, a reduction in the transmission factor of around 20% generated in the light passing through two of the polarizing films between each of the LCD panels 510 can be omitted. Therefore, in the present embodiment, as compared with the second embodiment in which two of the polarizing films are arranged for each of the LCD panels, reduction in the luminance at the time of light transmission can be lowered to a multiple of $1/(0.8^{n-1})$.

Fourth Embodiment

In the above embodiments, a light source which emits white and uniform light is used as the backlight unit 115 (FIG. 1). In the present embodiment, a light source which outputs three colors including RGB lights in a time division scheme is used as the backlight unit. In this case, each of the stacked LCD panels displays an image corresponding to the screen of RGB in a field sequential display in the time division scheme. If such a display scheme is adopted, the sense of discomfort caused by a parallax when observed in a slanted viewing direction can be removed by displaying the averaged image on at least one of the stacked LCD panels.

Fifth Embodiment

In a fifth embodiment, as a driving mode of the LCD panel, a driving mode in which the orientation angle of LC molecules with respect to the substrate surface changes depending on an applied voltage, such as a TN mode, is adopted. In this driving mode, in general, there is a problem in that the suitable viewing angle changes depending on the viewing direction, or azimuth angle, of the observer. This resulted from birefringence characteristic of the LC molecules, which changes depending on the viewing angle due to the change of the orientation angle of the LC molecules with respect to the substrate surface, and thereby the suitable viewing angle changes. If a plurality of LCD panels having a viewing angle characteristic such as above are stacked one on another with the pixels being aligned together, the condition described above is considered to become worse in an amount corresponding to the number of layers being stacked in a synergistic effect. Therefore, if such a driving mode is adopted, the rising direction of the LC molecules at the central part of the LC layer in the thickness direction is opposite between the adjacent LCD panels. In this case, characteristics of viewing angle dependency can be offset between these two LCD panels in which the LCD molecules are directed to opposite directions, whereby the averaging processing of the viewing angle characteristics can be attained.

Sixth Embodiment

Figure 10:
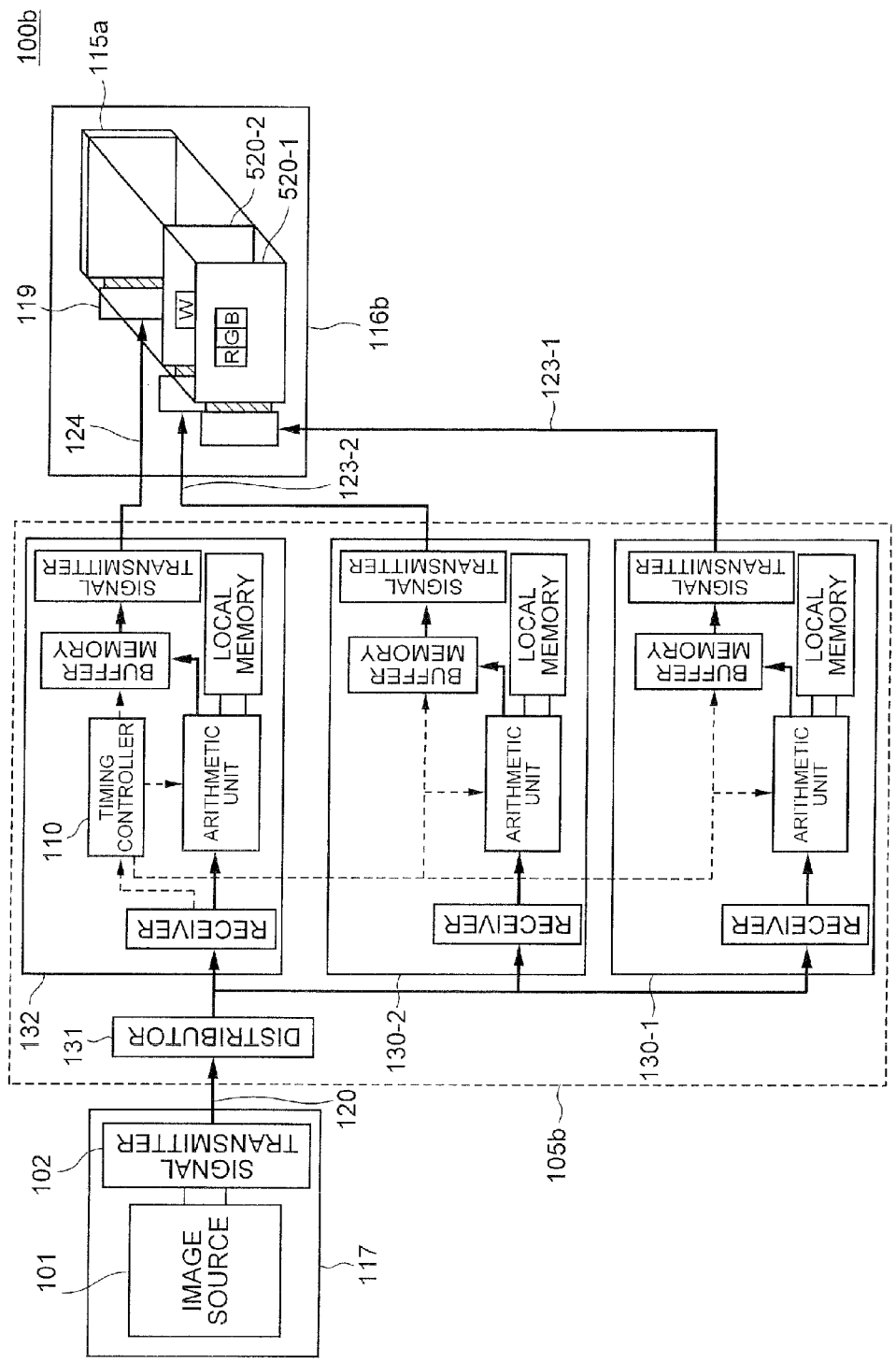
FIG. 10 a block diagram of a multiple-panel LCD device according to a sixth embodiment of the present invention together with an associated drive system.
Figure 11:
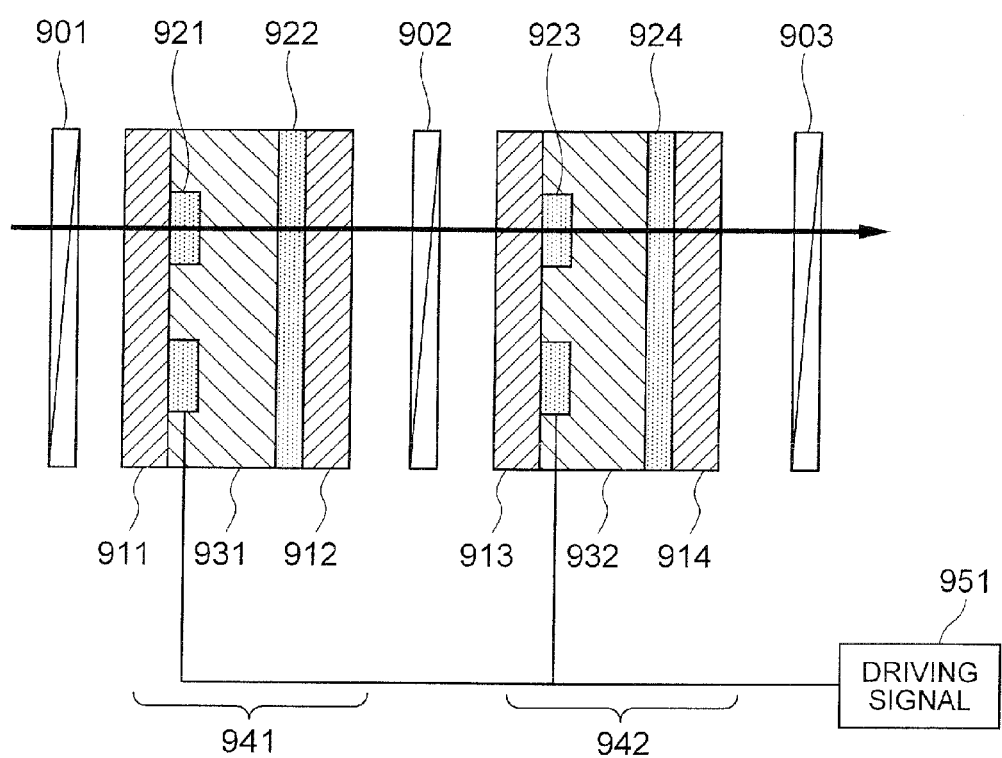
FIG. 11 is a sectional view of the configuration of a conventional LCD device having a multiple-panel structure in which two LCD panels are stacked one on another.

FIG. 10 shows a multiple-panel LCD device according to a sixth embodiment of the present invention together with am associated driving system. The LCD device, generally designated by numeral 100c, according to the present embodiment includes the LCD unit 116b in which light emission intensity of a backlight unit 115a is set variably. The backlight unit 115a is configured with a plurality of light-emitting diodes arranged in a matrix. Specifically, the backlight unit 115a is configured with 480×640 high-luminance white-light-emitting diodes. Luminance of each of the light emitting diodes is controlled by a backlight driving circuit 119.

An image data processing unit 105b includes a backlight controlling unit, i.e., image processing board 132. The backlight controlling unit 132 uses the image signal received via the distributor 131 to calculate a peak luminance for each pixel, or for each area of a plurality of areas divided from an entire area. Then, the backlight controlling unit 131 controls the backlight driving circuit 119 via the signal cable 124, and controls the emission intensity of the backlight unit 115a based on the peak luminance. In this manner, as compared with a case in which the emission intensity of the light source is not controlled, a contrast ratio can be increased by around 1.5 times.

Seventh Embodiment

In a multiple-panel LCD device according to a seventh embodiment of the present invention, a plurality of image sources are provided to allow a plurality of LCD panels to display thereon different images. For example, the first LCD panel displays the image from the image source, and the second LCD panel masks a part of the image from the image source. The present embodiment proposes such a display scheme for the LCD device having a plurality of stacked LCD panels.

In the above embodiments, an exemplified configuration is described in which TFTs are used as the non-linear elements in the LCD panel. However, the present invention is not limited thereto. For example, as the non-linear elements, thin film diodes can be used. In addition, if the required resolution is relatively low for the LCD device, the LCD panels can be driven by a simple-matrix driving scheme. The LCD device according to the above embodiments can achieve a high contrast ratio. Therefore, such LCD device has a significant effect when used as the image display unit such as an image diagnosis equipment which requires a higher contrast image, a monitor used at a broadcast station, and an image display section of an electronic apparatus used in a theater which offers the image in a dark environment state to show movie films.

As described above, the present invention may have the following embodiments.

In the LCD device of the first aspect, the n is 2, and one of two stacked LCD panels includes the color filter layer.

In addition, the at least one second polarizing film include a pair of polarizing films having optical transmission axes or optical absorption axes parallel to each other.

Moreover, the one of the stacked LCD panels is disposed at a front side of the LCD device.

In the LCD device of the second aspect, a single LCD panel among the stacked LCD panels includes a color filter layer.

In addition, the second driving signal is used for driving the single LCD panel.

Moreover, the averaging processing obtains an average of image data of pixels disposed within a range of specified distance (r) apart from a focused pixel.

Further, the averaging processing uses one of a simple averaging processing and a distance-weighted averaging processing.

Further, the averaging processing uses a distance-weighted averaging processing using a Gaussian distribution.

Further, the image data processing unit separates image data of the first driving signal into a luminance component and a color component, applies the averaging processing to both the luminance component and the color component, synthesizes the luminance component and the color component after the application of the averaging processing to thereby generate synthesized image data, and drives the another of the stacked LCD panels having a color filter layer by using the synthesized image data.

Further, if the first driving signal includes periodical image data in which full-transmission data having a transmission factor of TW and full-shield data having a transmission factor of TB periodically occur at a spatial period of p=3r and a duty ratio of 50%, the second driving signal includes full-transmission data having a transmission factor of TsW and a full-shield data having a transmission factor of TsB, where the following relationship holds:

$$TsW-TsB=(Tw-TB)/2.$$

Further, the averaging processing obtains an average of image data of pixels disposed within a range of specified distance (R) apart from a focused pixel, the specified distance R is represented by the following formula:

$$R=d\times\tan(\sin^{-1}(na/ng)\times\sin\theta)$$

where d, ng, na and θ are a distance between adjacent two of the stacked LCD panels, a refractive index of the transparent substrates, a refractive index of air, and a parallax angle between a slanted viewing direction and a perpendicular to the stacked LCD panels, respectively.

Further, the averaging processing obtains an average of image data of pixels disposed within a range of specified distance (r1) apart from a focused pixel, the specified distance r1 is represented by the following formula:

$$r1=d\times\tan(\sin^{-1}(na/ng)\times\sin(\tan^{-1}((L/2)/2L)),$$

where d, ng, na, and L are a distance between adjacent two of the stacked LCD panels, a refractive index of the transparent substrates, a refractive index of air, and a longer side of screen of the LCD device, respectively.

Further, the averaging processing obtains an average of image data of pixels disposed within a range of specified distance (r2) apart from a focused pixel, the specified distance r2 is represented by the following formula:

$$r2=d\times\tan(\sin^{-1}(na/ng)\times\sin(\tan^{-1}(L/2L)),$$

where d, ng, na, and L are a distance between adjacent two of the stacked LCD panels, a refractive index of the transparent substrates, a refractive index of air, and a longer side of screen of the LCD device, respectively.

Further, aid averaging processing obtains an average of image data of pixels disposed within a range of specified distance (r3) apart from a focused pixel, the specified distance r3 is represented by the following formula:

$$r3=d\times\tan(\sin^{-1}(na/ng)\times\sin(\tan^{-1}(2L/2L)),$$

where d, ng, na, and L are a distance between adjacent two of the stacked LCD panels, a refractive index of the transparent substrates, a refractive index of air, and a longer side of screen of the LCD device, respectively.

Further, the averaging processing obtains an average of image data of pixels disposed within a range of specified distance (r4) apart from a focused pixel, the specified distance r4 is represented by the following formula:

$$r4=d\times\tan(\sin^{-1}(na/ng).$$

where d, ng, and na are a distance between adjacent two of the stacked LCD panels, a refractive index of the transparent substrates, and a refractive index of air, respectively.

Further, the image data processing unit generates a third driving signal based on the first driving signal for driving at least one of the at least one of the stacked LCD panels, the third driving signal compensates a deviation (±α) of a total transmission factor of the stacked LCD panels from an original total transmission factor (Ta) thereof caused by the another of the stacked LCD panels driven by the second driving signal.

Further, the third driving signal changes a transmission factor of the at least one of the at least one of the stacked LCD panels by an amount β for compensating the deviation ±α which is different from the β, to recover the original total transmission factor Ta for the stacked LCD panels.

Further, the stacked LCD panels include a color LCD panel, a pixel of the color LCD panel having three divided areas corresponding to red, green and blue color filters of a color filter layer.

Further, the stacked LCD panels include a color LCD panel, a pixel of the color LCD panel having four or more than four divided areas, three of the four divided areas corresponding to red, green and blue color filters of a color filter layer.

Further, the stacked LCD panels include a color LCD panel and a monochrome LCD panel, and unit pixels corresponding to color filters in a pixel of the color LCD panel each have a size substantially equal to a size of a pixel of the monochrome LCD panel.

Further, the stacked LCD panels include a color LCD panel and a monochrome LCD panel, and a pixel including unit pixels corresponding to color filters in the color LCD panel has a size substantially equal to a size of a pixel of the monochrome LCD panel. 24. The LCD device according to claim 5, wherein the pair of transparent substrates each include an orientation film for defining an orientation of LC molecules in the LC layer in a vicinity of the transparent substrates.

Further, the polarizing films sandwiching therebetween each of the stacked LCD panels have optical transmission axes or optical absorption axes perpendicular to one another; an orientation direction of the LC layer is substantially parallel to the transparent substrates within a pretilt angle applied by the orientation film, and a twisted angle of the LCD layer is substantially zero degree with respect to the transparent substrates; the orientation film formed on one of the pair of transparent substrates has an orientation direction which is substantially parallel or apposite to an orientation direction of the orientation film formed on the other of the pair of transparent substrates and substantially parallel or perpendicular to the optical transmission axes or optical absorption axes of the polarizing films; and the stacked LCD panels each operate in a lateral-electric-field mode in which LC molecules in the LC layer are rotated in a plane substantially parallel to the transparent substrates for achieving a full transmission state and a full shield state.

Further, the stacked LCD panels include a first LCD panel and a second LCD panel consecutively arranged as viewed from a front side of the LCD device, and the orientation film formed on a front-side one of the transparent substrates of the second LCD panel has an orientation direction which is substantially parallel to an orientation direction of the orientation film formed on a rear-side one of the transparent substrates of the first LCD panel.

Further, the stacked LCD panels include a first LCD panel and a second LCD panel consecutively arranged as viewed from a front side of the LCD device, and the orientation film formed on a front-side one of the transparent substrates of the second LCD panel has an orientation direction which is substantially opposite to an orientation direction of the orientation film formed on a rear-side one of the transparent substrates of the first LCD panel.

Further, a retardation compensation film is interposed between at least one of the stacked LCD panels and at least one of the polarizing films adjacent to the at least one of the stacked LCD panels.

Further, the retardation compensation film has a refractive index of nx in a first in-plane direction, a refractive index of ny in a second in-plane direction perpendicular to the first in-plane direction, and a refractive index of nz in a thickness direction, the nx, ny and nz satisfying the following relationship:

$$nx \geq nz > ny.$$

Further, the retardation compensation film includes a first uniaxial retardation compensation layer having an optical axis parallel to the transparent substrates, and a second uniaxial retardation compensation layer having an optical axis perpendicular to the transparent substrates.

Further, the retardation compensation film is a negative uniaxial film having an optical axis parallel to the transparent substrates.

Further, the polarizing films sandwiching therebetween each of the stacked LCD panels have optical transmission axes or optical absorption axes perpendicular to one another; an orientation direction of the LC layer is twisted by 90 degrees between the transparent substrates; the transparent substrates each include a transparent electrode for driving the LC layer; the stacked LCD panels operate in a twisted-nematic mode in which LC molecules in the LC layer are rotated from a plane substantially parallel to the transparent substrates to a plane substantially perpendicular to the transparent substrates for achieving a full transmission state and a full shield state.

Further, the stacked LCD panels include an (i−1)-th LCD panel and an i-th LCD panel as numbered from a front side of the LCD device (0<i≦n), and the orientation film formed on a front-side one of the transparent substrates of the i-th LCD panel has an orientation direction which is substantially parallel to an orientation direction of the orientation film formed on a rear-side one of the transparent substrates of the (i−1)-th LCD panel.

Further, the stacked LCD panels include a (j−1)-th LCD panel and a j-th LCD panel as numbered from a front side of the LCD device (0<j≦n), a longer axis of LC molecules located substantially at center of the LC layer between the transparent substrates in the (j-th LCD panels has an angle of +θc with respect to the transparent substrates, and a longer axis of LC molecules located substantially at center of the LC layer between the transparent substrates in the (j−1)-th LCD panel has an angle of −θc with respect to the transparent substrates.

Further, a retardation compensation film is interposed between at least one of the stacked LCD panels and at least one of the polarizing films adjacent to the at least one of the stacked LCD panels.

Further, the retardation compensation film includes a discotic LC layer having a negative retardation and an optical axis changing continually in a thickness direction.

Further, the retardation compensation film includes a negative-retardation film having an optical axis inclined with respect to the transmission substrates, and the optical axis of the retardation compensation film projected onto a plane parallel to the transparent substrates is substantially parallel or perpendicular to an optical axis of the LC molecules in a vicinity of one of the transparent substrates projected onto the plane.

Further, the polarizing films sandwiching therebetween each of the stacked LCD panels have optical transmission axes or optical absorption axes perpendicular to one another; a longer axis of LC molecules in the LC layer stays at an initial direction substantially perpendicular to the transparent substrates; the transparent substrates each include a transparent electrode for driving the LC layer; the stacked LCD panels are operated by applying a voltage between the transparent electrodes to drive the LC molecules so that the longer axis of the LC molecules are turned from the initial direction toward a direction parallel to the transparent substrates.

Further, the retardation compensation film has a refractive index of nx in a first in-plane direction, a refractive index of ny in a second in-plane direction perpendicular to the first in-plane direction, and a refractive index of nz in a thickness direction, the nx, ny and nz satisfying the following relationship:

$$nx \geq nz > ny.$$

Further, the retardation compensation film includes a negative uniaxial film having an optical axis perpendicular to the transparent substrates.

Further, at least two of the stacked LCD panels are driven by different image data provided from different image sources.

Further, the stacked LCD panels each include a plurality of first electrode lines extending parallel to one another, a plurality of second electrode lines extending perpendicular to the first electrode lines, a common electrode, and a plurality of three-terminal switching devices each disposed in a vicinity of an intersection between the first electrode lines and the second electrode lines, and the stacked LCD panels are driven by an active-matrix driving scheme which drives the stacked LCD panels in a pseudo static driving scheme.

Further, one of the transparent substrates of each of the stacked LCD panels includes a plurality of first electrode lines extending parallel to one another, the other of the transparent substrates of the each of the stacked LCD panels includes a plurality of second electrode lines extending perpendicular to the first electrode lines, the one or the other of the transparent substrates includes a common electrode, and a plurality of three-terminal switching devices each are disposed in a vicinity of an intersection between the first electrode lines and the second electrode lines, and the stacked LCD panels are driven by an active-matrix driving scheme.

In the LCD system of the third aspect of the present invention, the image data processing unit generates third image data based on the first image data for displaying the same on at least one of the at least one of the stacked LCD panels, the third image data compensating a deviation (±α) of a total transmission factor of the stacked LCD panels from an original total transmission factor (Ta) thereof caused by the another of the stacked LCD panels driven by the second driving signal.

In addition, the image data processing unit includes a plurality of arithmetic units each for generating one of the plurality of image data for a corresponding one of the stacked LCD panels and the Moreover, the image data processing unit includes an averaging processing unit for performing the average processing and a transmission factor adjusting unit for generating the third image data.

Further, a backlight controller is provided for controlling backlight of the stacked LCD panels based on a peak luminance appearing in the first image data.

The present invention has been described based on the preferred embodiments. However, the LCD device and the image display mode of the present invention are not limited only to the embodiments described above. The configuration of the above embodiment with various modifications and alterations applied thereto, such as an addition of an image processing for performing a γ correction processing at an earlier and later stages of the averaging process, is included in the range of the present invention.

What is claimed is:

1. A liquid crystal display (LCD) device comprising:
a plurality (n) of LCD panels stacked one on another and each including a pair of transparent substrates and a liquid crystal (LC) layer sandwiched therebetween;
a pair of first polarizing films sandwiching therebetween said stacked LC panels;
at least one second polarizing film interposed between each adjacent two of said stacked LCD panels, and
an image data processing unit for generating a first driving signal for driving at least one of said stacked LCD panels and a second driving signal for driving another of said stacked LCD panels, said second driving signal being obtained by applying an averaging processing to said first driving signal.

2. The LCD device according to claim 1, wherein a single LCD panel among said stacked LCD panels includes a color filter layer.

3. The LCD device according to claim 2, wherein said second driving signal is used for driving said single LCD panel.

4. The LCD device according to claim 1, wherein said averaging processing obtains an average of image data of pixels disposed within a range of specified distance (r) apart from a focused pixel.

5. The LCD device according to claim 4, wherein said averaging processing uses one of a simple averaging processing and a distance-weighted averaging processing.

6. The LCD device according to claim 5, wherein said averaging processing uses a distance-weighted averaging processing using a Gaussian distribution.

7. The LCD device according to claim 1, wherein said image data processing unit separates image data of said first driving signal into a luminance component and a color component, applies said averaging processing to both said luminance component and said color component, synthesizes said luminance component and said color component after said application of said averaging processing to thereby generate synthesized image data, and drives said another of said stacked LCD panels having a color filter layer by using said synthesized image data.

8. The LCD device according to claim 4, wherein if said first driving signal includes periodical image data in which full-transmission data having a transmission factor of TW and full-shield data having a transmission factor of TB periodically occur at a spatial period of p=3r and a duty ratio of 50%, said second driving signal includes full-transmission data having a transmission factor of TsW and a full-shield data having a transmission factor of TsB, where the following relationship holds:

$$TsW-TsB=(Tw-TB)/2.$$

9. The LCD device according to claim 1, wherein said averaging processing obtains an average of image data of pixels disposed within a range of specified distance (r1) apart from a focused pixel, said specified distance r1 is represented by the following formula:

$$r1=d\times\tan(\sin^{-1}(na/ng)\times\sin(\tan^{-1}((L/2)/2L)),$$

where d, ng, na, and L are a distance between adjacent two of said stacked LCD panels, a refractive index of said transparent substrates, a refractive index of air, and a longer side of screen of said LCD device, respectively.

10. The LCD device according to claim 1, wherein said averaging processing obtains an average of image data of pixels disposed within a range of specified distance (r2) apart from a focused pixel, said specified distance r2 is represented by the following formula:

$$r2=d\times\tan(\sin^{-1}(na/ng)\times\sin(\tan^{-1}(L/2L)),$$

where d, ng, na, and L are a distance between adjacent two of said stacked LCD panels, a refractive index of said transparent substrates, a refractive index of air, and a longer side of screen of said LCD device, respectively.

11. The LCD device according to claim 1, wherein said averaging processing obtains an average of image data of pixels disposed within a range of specified distance (r3) apart from a focused pixel, said specified distance r3 is represented by the following formula:

$$r3=d\times\tan(\sin^{-1}(na/ng)\times\sin(\tan^{-1}(2L/2L)),$$

where d, ng, na, and L are a distance between adjacent two of said stacked LCD panels, a refractive index of said transparent substrates, a refractive index of air, and a longer side of screen of said LCD device, respectively.

12. The LCD device according to claim 1, wherein said averaging processing obtains an average of image data of pixels disposed within a range of specified distance (r4) apart from a focused pixel, said specified distance r4 is represented by the following formula:

$$r4=d\times\tan(\sin^{-1}(na/ng)$$

where d, ng, and na are a distance between adjacent two of said stacked LCD panels, a refractive index of said transparent substrates, and a refractive index of air, respectively.

13. The LCD device according to claim 1, wherein said image data processing unit generates a third driving signal based on said first driving signal for driving at least one of said at least one of said stacked LCD panels, said third driving signal compensates a deviation (±α) of a total transmission factor of said stacked LCD panels from an original total transmission factor (Ta) thereof caused by said another of said stacked LCD panels driven by said second driving signal.

14. The LCD device according to claim 13, wherein said third driving signal changes a transmission factor of said at least one of said at least one of said stacked LCD panels by an amount β for compensating said deviation ±α which is different from said β, to recover said original total transmission factor Ta for said stacked LCD panels.

15. The LCD device according to claim 1, wherein said stacked LCD panels include a color LCD panel, a pixel of said color LCD panel having three divided areas corresponding to red, green and blue color filters of a color filter layer.

16. The LCD device according to claim 1, wherein said stacked LCD panels include a color LCD panel, a pixel of said color LCD panel having four or more than four divided areas, three of said four divided areas corresponding to red, green and blue color filters of a color filter layer.

17. The LCD device according to claim 1, wherein said stacked LCD panels include a color LCD panel and a monochrome LCD panel, and unit pixels corresponding to color filters in a pixel of said color LCD panel each have a size substantially equal to a size of a pixel of said monochrome LCD panel.

18. The LCD device according to claim 1, wherein said stacked LCD panels include a color LCD panel and a monochrome LCD panel, and a pixel including unit pixels corresponding to color filters in said color LCD panel has a size substantially equal to a size of a pixel of said monochrome LCD panel.

19. The LCD device according to claim 1, wherein said pair of transparent substrates each include an orientation film for defining an orientation of LC molecules in said LC layer in a vicinity of said transparent substrates.

20. The LCD device according to claim 19, wherein:
said polarizing films sandwiching therebetween each of said stacked LCD panels have optical transmission axes or optical absorption axes perpendicular to one another;
an orientation direction of said LC layer is substantially parallel to said transparent substrates within a pretilt angle applied by said orientation film, and a twisted angle of said LCD layer is substantially zero degree with respect to said transparent substrates;
said orientation film formed on one of said pair of transparent substrates has an orientation direction which is substantially parallel or apposite to an orientation direction of said orientation film formed on the other of said pair of transparent substrates and substantially parallel or perpendicular to said optical transmission axes or optical absorption axes of said polarizing films; and
said stacked LCD panels each operate in a lateral-electric-field mode in which LC molecules in said LC layer are rotated in a plane substantially parallel to said transparent substrates for achieving a full transmission state and a full shield state.

21. The LCD device according to claim 20, wherein said stacked LCD panels include a first LCD panel and a second LCD panel consecutively arranged as viewed from a front side of said LCD device, and said orientation film formed on a front-side one of said transparent substrates of said second LCD panel has an orientation direction which is substantially parallel to an orientation direction of said orientation film formed on a rear-side one of said transparent substrates of said first LCD panel.

22. The LCD device according to claim 20, wherein said stacked LCD panels include a first LCD panel and a second LCD panel consecutively arranged as viewed from a front side of said LCD device, and said orientation film formed on a front-side one of said transparent substrates of said second LCD panel has an orientation direction which is substantially opposite to an orientation direction of said orientation film formed on a rear-side one of said transparent substrates of said first LCD panel.

23. The LCD panel according to claim 20, further comprising a retardation compensation film interposed between at least one of said stacked LCD panels and at least one of said polarizing fins adjacent to said at least one of said stacked LCD panels.

24. The LCD device according to claim 23, wherein said retardation compensation film has a refractive index of nx in a first in-plane direction, a refractive index of ny in a second in-plane direction perpendicular to said first in-plane direction, and a refractive index of nz in a thickness direction, said nx, ny and nz satisfying the following relationship:

$$nx \geq nz > ny.$$

25. The LCD device according to claim 23, wherein said retardation compensation film includes a first uniaxial retardation compensation layer having an optical axis parallel to said transparent substrates, and a second uniaxial retardation compensation layer having an optical axis perpendicular to said transparent substrates.

26. The LCD device according to claim 23, wherein said retardation compensation film is a negative uniaxial film having an optical axis parallel to said transparent substrates.

27. The LCD device according to claim 19, wherein:
said polarizing films sandwiching therebetween each of said stacked LCD panels have optical transmission axes or optical absorption axes perpendicular to one another;
an orientation direction of said LC layer is twisted by 90 degrees between said transparent substrates;
said transparent substrates each include a transparent electrode for driving said LC layer;
said stacked LCD panels operate in a twisted-nematic mode in which LC molecules in said LC layer are rotated from a plane substantially parallel to said transparent substrates to a plane substantially perpendicular to said transparent substrates for achieving a full transmission state and a full shield state.

28. The LCD device according to claim 27, wherein said stacked LCD panels include an (i−1)-th LCD panel and an i-th LCD panel as numbered from a front side of said LCD device (0<i≦n), and said orientation film formed on a front-side one of said transparent substrates of said i-th LCD panel has an orientation direction which is substantially parallel to an orientation direction of said orientation film formed on a rear-side one of said transparent substrates of said (i−1)-th LCD panel.

29. The LCD device according to claim 27, wherein said stacked LCD panels include a (j−1)-th LCD panel and a j-th LCD panel as numbered from a front side of said LCD device (0<j≦n), a longer axis of LC molecules located substantially at center of said LC layer between said transparent substrates in said j-th LCD panel has an angle of +θ c with respect to said transparent substrates, and a longer axis of LC molecules located substantially at center of said LC layer between said transparent substrates in said (j−1)-th LCD panel has an angle of −θ c with respect to said transparent substrates.

30. The LCD panel according to claim 27, further comprising a retardation compensation film interposed between at least one of said stacked LCD panels and at least one of said polarizing films adjacent to said at least one of said stacked LCD panels.

31. The LCD device according to claim 30, wherein said retardation compensation film includes a discotic LC layer having a negative retardation and an optical axis changing continually in a thickness direction.

32. The LCD device according to claim 30, wherein said retardation compensation film includes a negative-retardation film having an optical axis inclined with respect to said transmission substrates, and said optical axis of said retardation compensation film projected onto a plane parallel to said transparent substrates is substantially parallel or perpendicular to an optical axis of said LC molecules in a vicinity of one of said transparent substrates projected onto said plane.

33. The LCD device according to claim 1, wherein:
said polarizing films sandwiching therebetween each of said stacked LCD panels have optical transmission axes or optical absorption axes perpendicular to one another;
a longer axis of LC molecules in said LC layer stays at an initial direction substantially perpendicular to said transparent substrates;
said transparent substrates each include a transparent electrode for driving said LC layer;
said stacked LCD panels are operated by applying a voltage between said transparent electrodes to drive said LC molecules so that said longer axis of said LC molecules are turned from said initial direction toward a direction parallel to said transparent substrates.

34. The LCD panel according to claim 33, further comprising a retardation compensation film interposed between at least one of said stacked LCD panels and at least one of said polarizing films adjacent to said at least one of said stacked LCD panels.

35. The LCD device according to claim 34, wherein said retardation compensation film has a refractive index of nx in a first in-plane direction, a refractive index of ny in a second in-plane direction perpendicular to said first in-plane direction, and a refractive index of nz in a thickness direction, said nx, ny and nz satisfying the following relationship:

$$nx \geq nz > ny.$$

36. The LCD device according to claim 34, wherein said retardation compensation film includes a negative uniaxial film having an optical axis perpendicular to said transparent substrates.

37. The LCD device according to claim 1, wherein at least two of said stacked LCD panels are driven by different image data provided from different image sources.

38. The LCD device according to claim 1, wherein said stacked LCD panels each include a plurality of first electrode lines extending parallel to one another, a plurality of second electrode lines extending perpendicular to said first electrode lines, a common electrode, and a plurality of three-terminal switching devices each disposed in a vicinity of an intersection between said first electrode lines and said second electrode lines, and said stacked LCD panels are driven by an active-matrix driving scheme which drives said stacked LCD panels in a pseudo static driving scheme.

39. The LCD device according to claim 1, wherein one of said transparent substrates of each of said stacked LCD panels includes a plurality of first electrode lines extending parallel to one another, the other of said transparent substrates of said each of said stacked LCD panels includes a plurality of second electrode lines extending perpendicular to said first electrode lines, said one or the other of said transparent substrates includes a common electrode, and a plurality of three-terminal switching devices each are disposed in a vicinity of an intersection between said first electrode lines and said second electrode lines, and said stacked LCD panels are driven by an active-matrix driving scheme.

40. An electronic apparatus comprising the LCD device according to claim 1.

41. An image signal transmitter comprising the LCD device according to claim 1.

42. An image data switching apparatus comprising the LCD device according to claim 1.

43. An image data diagnosing apparatus comprising the LCD device according to claim 1.

44. An architectural structure comprising the LCD device according to claim 1 and an associated acoustic device fixed therein.

45. An image display system comprising:
a plurality of LCD panels stacked one on another and each including a pair of transparent substrates and a liquid crystal (LC) layer sandwiched therebetween;
an image data processing unit which generates first image data for displaying the same on at least one of said stacked LCD panels and second image data for displaying the same on another of said stacked LCD panels, said second image data being obtained by applying an averaging processing to said first image data;
a signal transmitter which transmits said image data to respective said LCD panels; and
a timing controller which controls a timing for said signal transmitter to transmit said image data.

46. The image display system according to claim 45, wherein said image data processing unit generates third image data based on said first image data for displaying the same on at least one of said at least one of said stacked LCD panels, said third image data compensating a deviation (±α) of a total transmission factor of said stacked LCD panels from an original total transmission factor (Ta) thereof caused by said another of said stacked LCD panels driven by said second driving signal.

47. The image display system according to claim 45, wherein said image data processing unit includes a plurality of arithmetic units each for generating one of said plurality of image data for a corresponding one of said stacked LCD panels.

48. The image display system according to claim 46, wherein said image data processing unit includes an averaging processing unit for performing said average processing and a transmission factor adjusting unit for generating said third image data.

49. The image display system according to claim 45, further comprising a backlight controller for controlling backlight of said stacked LCD panels based on a peak luminance appearing in said first image data.

* * * * *

UNITED STATES PATENT AND TRADEMARK OFFICE
CERTIFICATE OF CORRECTION

| | |
|---|---|
| PATENT NO. | : 7,843,529 B2 |
| APPLICATION NO. | : 11/737019 |
| DATED | : November 30, 2010 |
| INVENTOR(S) | : Ikeno et al. |

It is certified that error appears in the above-identified patent and that said Letters Patent is hereby corrected as shown below:

Claim 23, Col. 26, line 4 "polarizing fins adjacent" should be --polarizing film adjacent--.

Signed and Sealed this
Twentieth Day of March, 2012

David J. Kappos
*Director of the United States Patent and Trademark Office*